United States Patent
Murai et al.

(10) Patent No.: US 10,138,377 B2
(45) Date of Patent: Nov. 27, 2018

(54) LIGNIN DERIVATIVE, LIGNIN RESIN COMPOSITION, RUBBER COMPOSITION, AND MOLDING MATERIAL

(71) Applicant: SUMITOMO BAKELITE CO., LTD., Tokyo (JP)

(72) Inventors: Taketoshi Murai, Tokyo (JP); Hiroshige Nakagawa, Tokyo (JP); Mitsutaka Matsumoto, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 15/509,331

(22) PCT Filed: Aug. 31, 2015

(86) PCT No.: PCT/JP2015/074766
§ 371 (c)(1),
(2) Date: Mar. 7, 2017

(87) PCT Pub. No.: WO2016/039213
PCT Pub. Date: Mar. 17, 2016

(65) Prior Publication Data
US 2017/0253740 A1    Sep. 7, 2017

(30) Foreign Application Priority Data

Sep. 12, 2014 (JP) ................. 2014-186031
Sep. 12, 2014 (JP) ................. 2014-186849

(51) Int. Cl.
| | |
|---|---|
| C08L 97/00 | (2006.01) |
| C08L 21/00 | (2006.01) |
| C07G 1/00 | (2011.01) |
| C08H 7/00 | (2011.01) |
| C08K 5/00 | (2006.01) |
| C08L 1/02 | (2006.01) |

(52) U.S. Cl.
CPC .............. *C08L 97/005* (2013.01); *C07G 1/00* (2013.01); *C08H 6/00* (2013.01); *C08K 5/0025* (2013.01); *C08L 1/02* (2013.01); *C08L 21/00* (2013.01); *C08L 97/00* (2013.01); *C08L 2205/02* (2013.01); *C08L 2205/22* (2013.01)

(58) Field of Classification Search
CPC ................. C08L 97/005; C07G 1/00
See application file for complete search history.

(56) References Cited

U.S. PATENT DOCUMENTS

| | | | | | |
|---|---|---|---|---|---|
| 4,239,666 | A | * | 12/1980 | Jacko ............. | C08L 61/06 523/157 |
| 4,361,677 | A | * | 11/1982 | Furukawa ........... | B60C 15/06 525/133 |
| 4,764,596 | A | * | 8/1988 | Lora ............... | C07D 307/50 162/16 |
| 5,177,169 | A | * | 1/1993 | Schroeder ........... | C08H 6/00 527/400 |
| 5,196,460 | A | * | 3/1993 | Lora ............... | C08L 21/00 524/72 |
| 5,260,405 | A | * | 11/1993 | Gardziella ........ | C08G 8/28 106/218 |
| 5,948,503 | A | * | 9/1999 | Yamamoto ........... | C08L 7/00 264/109 |
| 2010/0249390 | A1 | * | 9/2010 | Azuma ............. | C07G 1/00 530/507 |
| 2013/0225719 | A1 | * | 8/2013 | Kuroe ............. | F16D 69/026 523/149 |
| 2013/0252292 | A1 | * | 9/2013 | Berlin ............ | C07B 63/02 435/135 |

FOREIGN PATENT DOCUMENTS

| | | |
|---|---|---|
| EP | 2535378 A1 | 12/2012 |
| EP | 2642150 A1 | 9/2013 |
| EP | 3059274 A1 | 8/2016 |
| JP | 5-98082 A | 4/1993 |
| JP | 2008-285626 A | 11/2008 |
| JP | 2009084320 A * | 4/2009 |
| JP | 2011-522085 A | 7/2011 |
| JP | 2012-201828 A | 10/2012 |
| JP | 2012-229330 A | 11/2012 |
| JP | 2013-35886 A | 2/2013 |
| JP | 2013-173882 A | 9/2013 |
| JP | 2013-227470 A | 11/2013 |
| SU | 711068 A * | 1/1980 |
| WO | 2009/145784 A1 | 12/2009 |

OTHER PUBLICATIONS

Machine Translation of JP 2009-084320 A (Year: 2017).*
International Search Report dated Sep. 29, 2015, issued in counterpart International Application No. PCT/JP2015/074766 (2 pages).
Ionita Firuta Fitigau et al., "Oxidative polymerization of lignins by laccase in water-acetone mixture", Acta Biochimica Polonica, vol. 60, No. 4/2013, 2013, pp. 817-822.

* cited by examiner

*Primary Examiner* — Liam J Heincer
(74) *Attorney, Agent, or Firm* — Westerman, Hattori, Daniels & Adrian, LLP

(57) ABSTRACT

A lignin derivative that is extracted from biomass and is used for rubber reinforcement or for use in a molding material is provided. Such a lignin derivative has a number average molecular weight of 300 to 2,000, and contains a component that is soluble in a polar organic solvent, in an amount of 80% by mass or more. When such a lignin derivative is incorporated, a lignin resin composition, a rubber composition, or a molding material, all of which have excellent low hysteresis loss characteristics, elastic modulus, or tensile properties, can be obtained. Furthermore, when a component that is thermofusible is used as the soluble component, a lignin resin composition, a rubber composition, or a molding material, all of which have superior aforementioned characteristics, can be obtained.

15 Claims, No Drawings

LIGNIN DERIVATIVE, LIGNIN RESIN COMPOSITION, RUBBER COMPOSITION, AND MOLDING MATERIAL

TECHNICAL FIELD

The present invention relates to a lignin derivative, a lignin resin composition, a rubber composition, and a molding material.

BACKGROUND ART

In recent years, there has been a demand for development of a technology of utilizing biomass of plants or plant-derived processed products, and a technology of converting biomass into petroleum-derived chemical products, resin products, and the like. For example, ligneous waste materials such as bark, lumber from thinning, and construction waste materials have been hitherto mostly disposed of. However, global environment protection has become an important problem to be solved, and from that point of view, studies have begun to be made on reutilization and recycling of ligneous waste materials.

Major components of general ligneous materials are cellulose, hemicellulose, and lignin. Among these, lignin is included at a proportion of about 30% in the ligneous materials, and since lignin has a structure richly containing aromatic rings, lignin can be utilized as an aromatic resin raw material.

Currently, investigations have been conducted on resin compositions, tires, and the like, in which lignin (lignin derivative) having a relatively low molecular weight that has been taken out (extracted) from biomass such as ligneous materials by various methods is utilized as a resin raw material (see, for example, PTL 1 and PTL 2).

Regarding the method for extracting a lignin derivative, the following method may be mentioned. For example, a delignification treatment performed at the time of pulp production or at the time of taking out a biofuel or a biomaterial from biomass; a solvent extraction treatment from residue and bagasse obtained after a saccharification treatment when a biofuel or a biomaterial is similarly taken out from biomass; a delignification treatment by means of a mechanical treatment; and a lignin extraction treatment by means of a high temperature high pressure water treatment, a steam blasting treatment, or an organosolv process may be used.

Lignin derivatives obtained as described above have highly polar structures richly containing phenolic hydroxyl groups or alcoholic hydroxyl groups. Therefore, investigations have been conducted on compositions and tires that utilize lignin derivatives as tackifiers and antioxidants (see, for example, PTL 1).

Meanwhile, lignin derivatives are also expected to be utilized as rubber reinforcing materials. Examples of a rubber reinforcing effect of lignin derivatives include an increase in the elastic modulus of rubber, a decrease in the hysteresis loss, and an increase in mechanical strength. These characteristics lead to enhancement of rigidity, low exothermic tendency, and mechanical strength of rubber component parts.

Furthermore, for example, in PTL 2, lignin is dissolved in black liquor containing sodium hydroxide and sodium sulfide, particulate lignin derivatives are collected from the black liquor containing the dissolved lignin, and the lignin derivatives are utilized as filler materials to be added to rubber compositions. However, in this case, such lignin derivatives do not have sufficient characteristics as filler materials, and cause a decrease in rigidity or mechanical strength of a rubber composition.

In addition to that, PTL 3 discloses that lignophenol, which is a product of addition of phenol to lignin, is produced by treating biomass using phenol and concentrated sulfuric acid, and lignophenol is utilized as a rubber reinforcing resin. However, although systems using various lignophenol derivatives are disclosed, these systems include large quantities of phenols, which are petroleum-derived components, and a rubber reinforcing effect for rigidity or the like is also insufficient.

CITATION LIST

Patent Literature

[PTL 1] PCT Japanese Translation Patent Publication No. 2012-229330
[PTL 2] PCT Japanese Translation Patent Publication No. 2011-522085
[PTL 3] Japanese Unexamined Patent Application Publication No. 2008-285626

SUMMARY OF INVENTION

Technical Problem

An object of the invention is to provide a lignin derivative for rubber reinforcement or for use in a molding material, which has a predetermined number average molecular weight and can impart excellent low hysteresis loss characteristics, elastic modulus, or tensile properties by including a component that is soluble in a polar organic solvent (soluble component). Particularly, it is the object of the invention to provide a lignin derivative for rubber reinforcement or for use in a molding material, which can impart superior aforementioned characteristics by using a soluble component that is thermofusible (softening point is 80° C. to 160° C.). Also, it is another object of the invention to provide a lignin resin composition, a rubber composition, and a molding material, all of which include such a lignin derivative.

Solution to Problem

Such objects are achieved by the inventions of the following items (1) to (16).

(1) A lignin derivative extracted from biomass and used for rubber reinforcement or for use in a molding material, the lignin derivative having a number average molecular weight of 300 to 2,000 and containing a component soluble in a polar organic solvent, in an amount of 80% by mass or more.

(2) The lignin derivative according to (1), wherein the polar organic solvent is acetone.

(3) The lignin derivative according to (1) or (2), wherein the lignin derivative contains the component in an amount of 95% by mass or more.

(4) The lignin derivative according to any one of (1) to (3), wherein the number average molecular weight of the component is 300 to 750.

(5) The lignin derivative according to any one of (1) to (4), wherein the softening temperature of the component is 80° C. to 160° C.

(6) The lignin derivative according to any one of (1) to (5), wherein the lignin derivative is extracted by cooking biomass by means of an organosolv process using a chemical agent including an organic solvent.

(7) The lignin derivative according to (6), wherein the organic solvent includes at least one of an alcohol, a ketone, and an ether.

(8) The lignin derivative according to (6) or (7), wherein the organic solvent includes a lower alcohol.

(9) The lignin derivative according to (8), wherein the organic solvent includes a lower alcohol, and the other organic solvent includes acetone.

(10) A lignin resin composition including the lignin derivative according to any one of (1) to (9) and a resin material.

(11) The lignin resin composition according to (10), wherein the resin material includes a phenolic resin.

(12) The lignin resin composition according to (11), wherein the phenolic resin includes at least one of a cashew-modified phenolic resin, a tall-modified phenolic resin, an alkyl-modified phenolic resin, and a cashew resin.

(13) A rubber composition including the lignin derivative according to any one of (1) to (9) and a rubber material.

(14) The rubber composition according to (13), wherein the rubber material includes at least one of natural rubber, butadiene rubber, and styrene-butadiene rubber.

(15) The rubber composition according to (13) or (14), further including a crosslinking agent, and/or a filler.

(16) A molding material including the lignin derivative according to any one of (1) to (9), and a resin material.

Advantageous Effects of Invention

According to the invention, a lignin resin composition, a rubber composition, or a molding material, which has excellent low hysteresis loss characteristics, elastic modulus, or tensile properties, can be obtained by incorporating a lignin derivative having a predetermined number average molecular weight and containing a component soluble in a polar organic solvent (soluble component). Furthermore, when a component that is thermofusible is used as the soluble component, a lignin resin composition, a rubber composition, or a molding material, which has superior aforementioned characteristics, can be obtained. Particularly, when a phenolic resin is incorporated, a lignin resin composition, rubber composition, or molding material thus obtainable exhibits excellent low hysteresis loss characteristics, and achieves an excellent balance between the elastic modulus, moldability, and tensile properties.

DESCRIPTION OF EMBODIMENTS

Hereinafter, the lignin derivative of the invention, a method for producing the lignin derivative, a lignin resin composition, a rubber composition, and a molding material will be explained in detail based on suitable embodiments.

The lignin derivative of the invention contains, among those lignin derivative components obtainable by various methods, a component that has a predetermined number average molecular weight and is soluble in a polar organic solvent (soluble component). When such a lignin derivative is mixed with a rubber material, a rubber composition can be prepared, and when such a lignin derivative is mixed with a resin material, a lignin resin composition or a molding material can be prepared.

Particularly, it is important in the invention that the lignin derivative contains a component that is soluble in a polar organic solvent, in an amount of 80% by mass or more.

In the following description, the lignin derivative of the invention that is used for rubber reinforcement or for use in a molding material will be explained.

<Lignin Derivative>

First, the lignin derivative will be explained. Lignin is a major component that forms the skeleton of a plant body together with cellulose and hemicellulose, and is one of materials that exist most abundantly in nature.

A lignin derivative is a compound having a phenol derivative as a unit structure. Since this unit structure has a carbon-carbon bond or a carbon-oxygen-carbon bond, which are both chemically and biologically stable, the unit structure is not likely to be subjected to chemical deterioration or biological degradation. Therefore, lignin derivatives are considered to be useful as resin raw materials to be added to a rubber composition or a molding material.

According to the present specification, a high molecular weight lignin that is included in biomass is simply referred to as "lignin", and a lignin having a relatively low molecular weight that is derived from the aforementioned lignin is referred to as "lignin derivative". Furthermore, the term biomass according to the present specification refers to plants or plant-derived processed products, which contains lignin, and examples of the plant include broad-leaved trees such as beech, white birch, and oak; coniferous trees such as cedar, pine tree, and cypress; bamboo; gramineous plants such as rice straw; and coconut shell.

Specific examples of the lignin derivative include a guaiacyl propane structure represented by the following Formula (1), a syringyl propane structure represented by the following Formula (2), and a 4-hydroxyphenylpropane structure represented by the following Formula (3). Meanwhile, the guaiacyl propane structure is mainly extracted from coniferous trees, the guaiacyl propane structure and the syringyl propane structure are mainly extracted from broad-leaved trees, and the guaiacyl propane structure, the syringyl propane structure, and the 4-hydroxyphenylpropane structure are mainly extracted from herbaceous plants.

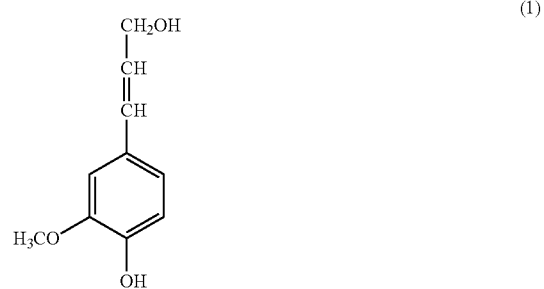

(1)

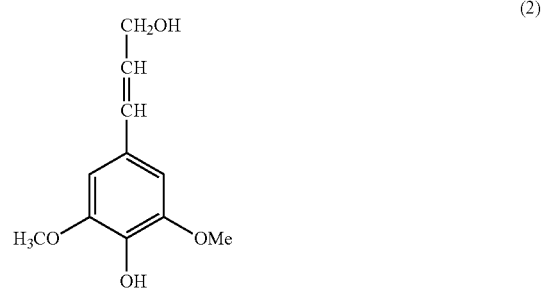

(2)

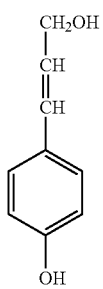

(3)

Furthermore, it is preferable for the lignin derivative according to the invention that at least one of the ortho-position and the para-position of the aromatic ring with respect to the hydroxyl group is unsubstituted. Such a lignin derivative has excellent reactivity because the lignin derivative contains many reaction sites at which a curing agent acts on the aromatic ring as a result of an electrophilic substitution reaction, and since the steric hindrance to the reaction with the hydroxyl group is reduced. On the other hand, a lignin resin composition including a phenolic resin having a large amount of parts in which the ortho-position and the para-position of the aromatic ring with respect to the hydroxyl group are unsubstituted, has sufficient reactivity because the reaction sites of the phenolic resin are available.

In addition to the basic structures described above, the lignin derivative may also be secondary lignin derivative having a functional group introduced into one of the basic structures described above.

The functional group carried by a secondary lignin derivative is not particularly limited; however, for example, a functional group capable of reacting with a functional group of the same kind, or a functional group capable of reacting with a different functional group is suitable. Specific examples thereof include an epoxy group and a methylol group, as well as a vinyl group having an unsaturated carbon-carbon bond, an ethynyl group, a maleimide group, a cyanate group, and an isocyanate group. Among these, a secondary lignin derivative obtained by introducing a methylol group into a lignin derivative (methylolated) is preferably used. Such a secondary lignin derivative undergoes self-crosslinking caused by a self-condensation reaction between methylol groups, and undergoes further crosslinking with an alkoxymethyl group or a hydroxyl group present in a crosslinking agent that will be described below. As a result, a cured product having a particularly homogeneous and rigid skeleton and having excellent solvent resistance can be obtained.

Here, the lignin derivative according to the invention is a lignin derivative which, among those lignin derivative components obtainable by various methods, has a predetermined number average molecular weight and contains a component that is soluble in a polar organic solvent. When mixed with a rubber material, such a lignin derivative can impart excellent elastic modulus and tensile properties to a rubber composition. That is, a rubber composition that is used for producing a rubber manufactured product includes additives for various purposes, in addition to a rubber material (raw material rubber). One of these additives is a reinforcing material. When a reinforcing material is added, hardness, tensile strength, abrasion resistance, and the like can be imparted to a rubber composition. Therefore, when a lignin derivative according to the invention is used as a reinforcing material for a rubber composition, a rubber composition having excellent elastic modulus and tensile properties can be prepared. Also, when a phenolic resin is further incorporated into the lignin derivative according to the invention and a rubber material, a rubber composition having an excellent balance between low hysteresis loss characteristics, rubber elasticity and tensile properties can be adjusted.

A molding material that is used for producing a molded article includes additives for various purposes, in addition to a resin material. When the lignin derivative according to the invention is used as this additive, a molding material having excellent elastic modulus and flexural properties can be prepared.

It is preferable that such a lignin derivative is a compound obtainable by decomposing biomass. Since biomass is a material obtained by fixating carbon dioxide in the atmosphere in water during the course of photosynthesis, biomass contributes to the suppression of increase of carbon dioxide in the atmosphere. Therefore, industrial utilization of biomass can contribute to the suppression of global warming. Examples of biomass include lignocellulose-based biomass. Examples of the lignocellulose-based biomass include leaves, bark, branches and wood of plants containing lignin; and processed products thereof. Examples of the plants containing lignin include the above-mentioned broad-leaved trees, coniferous trees, and gramineous plants. Examples of the method for decomposition (extraction method) include a method of performing a chemical treatment (for example, a method based on an organosolv process using a chemical agent including an organic solvent), a method of performing hydrolysis, a steam blasting method, a supercritical water treatment method, a subcritical water treatment method, a method of performing a mechanical treatment, a cresol sulfate method, and a pulp production method. From the viewpoint of environmental burden, a steam blasting method, a subcritical water treatment method, and a method of performing a mechanical treatment are preferred. From the viewpoint of cost, it is preferable to use a pulp production method, and to use side products of biomass utilization. A lignin derivative can be prepared by, for example, subjecting biomass to a decomposition treatment at 150° C. to 400° C. and 1 to 40 MPa for 8 hours or less in the presence of a solvent. Also, lignin derivatives can be prepared by the methods disclosed in Japanese Unexamined Patent Application Publication No. 2009-084320 and Japanese Unexamined Patent Application Publication No. 2012-201828.

Since lignin derivatives are products extracted from biomass, which is a natural product, lignin derivatives are complexes of various compounds. Therefore, it is almost impossible to specifically characterize all the chemical structures of those compounds. However, the present inventors found that a lignin resin composition, a rubber composition, or a molding material, which has excellent low hysteresis loss characteristics, elastic modulus, or tensile properties, can be obtained by using a lignin derivative which exhibits predetermined characteristics. In other words, when it is attempted to obtain the above-described effects by using a lignin derivative exhibiting predetermined characteristics, the present inventors think that specifying all the chemical structures of the compounds that constitute lignin derivatives is meaningless. Such lignin derivatives that exhibit predetermined characteristics can be obtained by the various methods described above; however, among them, particularly when an organosolv process is used, lignin derivatives can be obtained relatively conveniently with high yield.

Also, as described above, the lignin derivative according to the invention contains a component that is soluble in a polar organic solvent (hereinafter, simply referred to as "soluble component").

In the invention, the number average molecular weight of the soluble component in the lignin derivative is 300 to 2,000. The number average molecular weight of the soluble component is a number average molecular weight measured by a gel penetration chromatography (GPC) analysis of a lignin derivative, and calculated relative to polystyrene standards. A soluble component having such a number average molecular weight has excellent reactivity with a resin material. Therefore, when a lignin resin composition is prepared by mixing such a lignin derivative with a resin material, the molecular weight of the lignin resin composition can be easily adjusted to a desired range according to the purpose of use of the lignin resin composition by adjusting the conditions of mixing (temperature, pressure, mixing time, and the like). For example, a rubber composition including such a lignin resin composition can have enhanced rubber reinforcing characteristics.

Furthermore, the number average molecular weight of the soluble component is preferably about 300 to 1,000, and more preferably about 300 to 750. When the number average molecular weight of the soluble component is within the range described above, reactivity of the soluble component with a resin material is further enhanced, and the molecular weight of the lignin resin composition can be more easily adjusted.

Examples of the polar organic solvent include lower alcohols such as methanol and ethanol; phenols such as phenol and cresol; ketones such as methyl ethyl ketone and acetone; cyclic ethers such as tetrahydrofuran and dioxane; nitriles such as acetonitrile; amides such as N,N-dimethylformamide, N,N-dimethylacetamide, and n-methylpyrrolidone; alkyl halides such as methylene chloride and chloroform; and dimethyl sulfoxide (DMSO). Among these polar organic solvents, it is preferable that the soluble component in the lignin derivative is soluble in a lower alcohol such as methanol or ethanol; or a ketone such as methyl ethyl ketone or acetone, and it is more preferable that the soluble component is soluble in acetone. A lignin derivative is not easily dissolved in a lower alcohol, a ketone, or the like. Therefore, it is difficult to dissolve a relatively high molecular weight lignin derivative in such a polar organic solvent. Accordingly, the soluble component of a lignin derivative that dissolves in such as polar organic solvent has a sufficiently small molecular weight. Particularly, a soluble component of a lignin derivative that is soluble in acetone more reliably has a molecular weight within the predetermined range described above.

Here, an example of the procedure for measuring the number average molecular weight of the soluble component by the gel permeation chromatography analysis will be explained.

First, a lignin derivative is dissolved in the polar organic solvent described above, insoluble components are removed, and then the remaining components are concentrated and dried. Thus, a lignin derivative containing soluble components in an amount of 80% by mass or more (preferably, an amount of 95% by mass or more) is prepared. This lignin derivative is dissolved in a solvent that is used for the gel permeation chromatography analysis, and a measurement sample is produced. The solvent used at this time is not particularly limited as long as it is a solvent that can dissolve a lignin derivative; however, for example, the various organic solvents described above can be used. Meanwhile, from the viewpoint of the measurement accuracy of gel permeation chromatography, tetrahydrofuran is preferred.

Next, organic general-purpose columns packed with a styrene-based polymer filler, "TSKgel GMHXL (manufactured by Tosoh Corp.)" and "G2000HXL (manufactured by Tosoh Corp.)", are connected in series to a GPC system, "HLC-8320GPC (manufactured by Tosoh Corp.)".

200 μL of the measurement sample described above is injected into this GPC system, and tetrahydrofuran of an eluent is developed at a rate of 1.0 mL/min at 40° C. The retention time is measured by utilizing the differential refractive index (RI) and the ultraviolet absorbance (UV). Meanwhile, a calibration curve showing the relation between the retention time and the molecular weight of polystyrene standards is produced separately, and the number average molecular weight of the lignin derivative described above can be calculated.

There are no particular limitations on the polystyrene standards that are used to produce a calibration curve; however, polystyrene standards having number average molecular weights of 427,000, 190,000, 96,400, 37,900, 18,100, 10,200, 5,970, 2,630, 1,050, and 500 (manufactured by Tosoh Corp.) can be used.

Furthermore, the lignin derivative according to the invention contains the soluble component in an amount of 80% by mass or more. The molecular weight of such a lignin derivative can be sufficiently lowered. Therefore, when a rubber composition is prepared by mixing a lignin derivative with a rubber material, dispersibility of the lignin derivative in a rubber material can be increased. Therefore, a homogeneous rubber composition can be prepared. Similarly, when a molding material is prepared by mixing such a lignin derivative with a resin material, dispersibility of the lignin derivative in a resin material can be increased. Therefore, a homogeneous molding material can be prepared.

Furthermore, it is preferable that the lignin derivative contains the soluble component in an amount of 90% by mass or more, and it is more preferable that the lignin derivative contains the soluble component in an amount of 95% by mass or more. Thereby, the above-described effects become more noticeable.

The amount of the soluble component in a lignin derivative can be calculated using, for example, the following method. First, to 700 g of a lignin derivative, a polar organic solvent in an amount 10 times the mass of the lignin derivative is added, and the mixture is stirred. The lignin derivative is immersed for 12 hours or longer, and then a solid residue is removed (separated), and thus a solution is obtained. This solution is concentrated and dried under reduced pressure for 2 hours or longer at 50° C., and thus a measurement sample is obtained. From the weight of this measurement sample and the weight of the lignin derivative obtained before immersion in a polar organic solvent, the content of the soluble component can be calculated.

In a case in which a component that is insoluble in a polar organic solvent (hereinafter, simply referred to as "insoluble component") is included in a lignin derivative, this insoluble component is a component having a larger molecular weight compared to a soluble component. Since the lignin derivative of the invention contains a large amount of soluble components having relatively small molecular weights as described above, even in a case in which the lignin derivative contains such an insoluble component, the lignin derivative has high fluid characteristics at the time of molding processing, and has high dispersibility in a resin material or a rubber material. Therefore, a rubber composition including such a lignin resin composition can have enhanced rubber reinforcing characteristics.

When a lignin derivative containing an insoluble component is used, the hysteresis loss characteristics of a lignin resin composition, a rubber composition or a molding material can be further reduced, and the mechanical strength of such a composition can be further enhanced. Such an effect is noticeably exhibited when the lignin derivative contains the soluble component having a low molecular weight and the insoluble component having a high molecular weight.

It is preferable that the lignin derivative contains the insoluble component in an amount of about 0.1% to 10% by mass, and more preferably about 1% to 5% by mass. When the content of the insoluble component in the lignin derivative is in the range described above, superior low hysteresis loss characteristics and mechanical strength can be imparted to a lignin resin composition, a rubber composition, or a molding material, while moldability of the lignin derivative is maintained.

The softening point of the soluble component in the lignin derivative according to the invention is preferably 200° C. or lower, more preferably 180° C. or lower, and even more preferably 80° C. to 160° C. If the softening point is higher than the upper limit, thermofusibility and fluidity of the lignin derivative are decreased depending on the composition of the resin material or rubber material that is mixed with the lignin derivative, and there is a risk that dispersibility in the resin material or the rubber material may be decreased. On the other hand, if the softening point is lower than the lower limit, thermofusibility and fluidity of the lignin derivative become too high depending on the composition of the resin material to be mixed with the lignin derivative, and there is a risk that burrs may occur at the time of molding a rubber composition or a molding material. Therefore, when a molding material is produced, handleability of a lignin derivative is deteriorated, and there is a risk that the loss at the time of production may increase. Also, thermofusibility and fluidity of the lignin derivative become too high, the lignin derivative is hardened by blocking at room temperature, and there is a risk that storability may be deteriorated.

Regarding the method for measuring the softening point, a ring and ball softening point tester (Model ASP-MG2 manufactured by Mertech, Inc.) can be used according to JIS K 2207.

The lignin derivative according to the invention may have a carboxyl group. In a case in which the lignin derivative has the carboxyl group, the lignin derivative can be crosslinked with a crosslinking agent that will be described below. That is, when the number of crosslinking points in the lignin derivative increases, the crosslinking density can be increased, and therefore, excellent solvent resistance is obtained. Furthermore, the carboxyl group also acts as a catalyst for the crosslinking agent, the crosslinking reaction of the crosslinking agent for the lignin derivative can be accelerated, and thus solvent resistance or the curing rate can be enhanced.

In a case in which the lignin derivative described above has a carboxyl group, the carboxyl group can be checked by the presence or absence of absorption of a peak at 172 to 174 ppm when the lignin derivative is submitted to a $^{13}$C-NMR analysis.

<Method for Producing Lignin Derivative>

Next, the method for producing the lignin derivative will be explained.

The method for producing of a lignin derivative is not particularly limited; however, several examples will be explained below.

First, a method for producing a lignin derivative by a high temperature and high pressure treatment of biomass will be described.

<Lignin Derivative Production Method 1: High Temperature and High Pressure Treatment Method>

The method for producing the resin composition of the invention includes [1] a step of leaving biomass to stand in the presence of a solvent, and subjecting this to a decomposition treatment under high temperature and high pressure conditions; [2-a] in a case in which a lignin derivative is included in the solid component in the treated product, a step of treating the solid component with a polar solvent, and separating a fraction that is insoluble in the polar solvent from a solution, and/or [2-b] in a case in which a lignin derivative is included in the liquid component in the treated product, a step of separating the liquid component (solution) containing the lignin derivative from a solid component; [3] a step of drying the solution of [2-a] and/or [2-b], and collecting a solute (lignin derivative); and optionally, [4] a step of mixing the collected solute with other resin components (resin materials), and obtaining a lignin resin composition. Hereinafter the various steps will be explained.

[1]

First, biomass is left to stand in the presence of a solvent, and this is subjected to a decomposition treatment under high temperature and high pressure conditions. Biomass refers to plants or plant-derived processed products as described above, and examples of these plants include broad-leaved trees such as beech, white birch, and oak; coniferous trees such as cedar, pine tree, and cypress; bamboo; gramineous plants such as rice straw; and coconut shell.

On the occasion of the decomposition treatment, it is preferable that the biomass is pulverized into a block form, a chip form, a powder form, or the like. In that case, the size after pulverization is preferably about 100 m to 1 cm, and more preferably about 200 to 1,000 μm. When biomass having such a size is used, dispersibility of the biomass in a liquid can be increased, and also, a decomposition treatment of biomass can be carried out efficiently.

Examples of the solvent that is used in the present step include water; alcohols such as methanol and ethanol; phenols such as phenol and cresol; ketones such as acetone and methyl ethyl ketone; ethers such as dimethyl ether, ethyl methyl ether, diethyl ether, and tetrahydrofuran; nitriles such as acetonitrile; and amides such as N,N-dimethylformamide. Among these, one kind of solvent or a mixed solvent of two or more kinds is used.

Furthermore, regarding the solvent, water is particularly preferably used. Regarding water, for example, ultrapure water, pure water, distilled water, or ion-exchanged water is used. When water is used, unintended modification of the lignin derivative is suppressed, and since the waste water generated in association with a decomposition treatment is aqueous, environmental burden can be suppressed to a minimal level. It is better as the amount of the solvent to be used is larger with respect to the biomass; however, the amount of the solvent is preferably about 1 to 20 times by mass, and more preferably about 2 to 10 times by mass, with respect to the biomass.

Next, the biomass that has been left to stand in the presence of a solvent is subjected to a decomposition treatment under high temperature and high pressure conditions. Thereby, the biomass is decomposed into lignin, cellulose, hemicellulose, and other decomposition products or reaction products thereof.

In regard to the production of a high temperature and high pressure environment, the vessel is not particularly limited as long as it is a vessel capable of withstanding high temperature and high pressure, and a pressure-resistant vessel such as an autoclave can be used. It is preferable that this pressure-resistant vessel includes a heating means or a stirring means, and it is preferable to apply mechanical energy by, for example, stirring the biomass under high temperature and high pressure conditions. Furthermore, the pressure-resistant vessel may also include means for pressurizing the vessel independently of those factors affecting pressure, such as the temperature inside the vessel. Examples of such means include means for introducing an inert gas such as nitrogen gas or argon gas into the vessel.

Regarding the conditions for the decomposition treatment, the treatment temperature is preferably 150° C. to 400° C., more preferably 180° C. to 350° C., and even more preferably 220° C. to 320° C. When the treatment temperature is in the range described above, the molecular weight of the lignin derivative obtainable after decomposition can be optimized. Thereby, a balance between moldability of a lignin resin composition, a rubber composition or a molding material and solvent resistance after curing can be achieved at a higher level.

Regarding the treatment time for the decomposition treatment, an appropriate treatment time may also be used depending on the apparatus used for the treatment. For example, if the apparatus to be used is an autoclave, the treatment time is preferably 480 minutes or less, and more preferably 15 to 360 minutes. In a case in which the treatment time is 480 minutes or longer, since thermal energy cost is required, the production cost increases. If the treatment time is shorter than 15 minutes, there is no problem; however, depending on the apparatus, heat transfer may occur insufficiently, and decomposition of biomass may occur insufficiently.

Furthermore, the pressure for the decomposition treatment is preferably 1 to 40 MPa, more preferably 1.5 to 25 MPa, and even more preferably 3 to 20 MPa. When the pressure is in the range described above, the decomposition efficiency for biomass can be remarkably improved, and as a result, shortening of the treatment time can be attempted.

As a pretreatment for the decomposition step, it is preferable to perform a step of sufficiently stirring biomass and the solvent described above, and mixing the two thoroughly and evenly. Thereby, decomposition of biomass can be made particularly optimal. The stirring temperature is preferably about 0° C. to 150° C., and more preferably about 10° C. to 130° C. Furthermore, the stirring time is preferably about 1 to 120 minutes, and more preferably about 5 to 60 minutes. Furthermore, examples of the stirring method include methods using various mills such as a ball mill and a bead mill, a stirrer equipped with a stirring blade, or the like; and methods using hydraulic stirring by means of a homogenizer, a jet pump, and the like.

Furthermore, if necessary, a catalyst that accelerates the decomposition treatment, and an oxidizing agent may also be added to the solvent. Examples of this catalyst include inorganic bases such as sodium carbonate; and inorganic acids such as acetic acid and formic acid, and examples of the oxidizing agent include hydrogen peroxide. The amount of addition of these catalyst and oxidizing agent is preferably about 0.1% to 10% by mass, and more preferably about 0.5% to 5% by mass, as the concentration in an aqueous solution.

Regarding the solvent to be used for the decomposition treatment, it is preferable that the solvent is used in a subcritical state or a supercritical state (conditions). A solvent that is in a subcritical state or a supercritical state can accelerate a decomposition treatment of biomass without any special additive components such as a catalyst. Therefore, biomass can be subjected to a decomposition treatment in a short time without using a complicated separation process, and reduction of the production cost for lignin derivatives and simplification of the production step can be attempted.

As an example, the critical temperature of water is about 374° C., and the critical pressure is about 22.1 MPa.

[2-a]

The treated product in the pressure-resistant vessel is filtered. The filtrate is removed, and a solid component that has been separated by filtration is collected. The solid component thus collected is immersed in a solvent in which lignin derivatives are soluble. The solid component immersed in this solvent is further filtered, and thereby the solid component is separated into a component that dissolves in the solvent (soluble fraction) and a component that is insoluble in the solvent (insoluble fraction).

Regarding the solvent in which lignin is soluble, various polar organic solvents are used, and particularly, a solvent including a lower alcohol such as methanol or ethanol; or a ketone such as acetone or methyl ethyl ketone, is preferably used. When these polar organic solvents are used, lignin derivatives that dissolve in a polar organic solvent, and lignin derivatives that are insoluble in this polar organic solvent can be separated and extracted from the solid component thus collected.

The immersion time is not particularly limited; however, the immersion time is preferably about 1 to 48 hours, and more preferably about 2 to 30 hours. Furthermore, it is also possible to heat the solid component to a temperature lower than or equal to the boiling point of the solvent at the time of immersion.

[2-b]

The treated product in the pressure-resistant vessel is filtered. Thus, a solid component is removed, and a filtrate that has been separated by filtration is collected.

[3]

Next, the solvent in which the lignin derivatives are soluble is distilled off from the filtrate (solution) obtained by the separation step, and a dried solute (lignin derivatives) is collected.

In a case in which two or more kinds of solvents are used for the decomposition treatment, two or more kinds of solvents are included in the filtrate (solution).

In a case in which lignin derivatives are uniformly dispersed in two or more kinds of solvents, it is preferable to distill off the solvents altogether.

In a case in which the filtrate (solution) has undergone phase separation into a layer containing lignin derivatives and a layer that does not contain lignin derivatives, it is preferable that first, the layer that does not contain lignin derivatives is separated, and thereby only a solution containing lignin derivatives is collected. Next, it is preferable to distill off the solvent from the solution thus collected.

Regarding the method of distilling off the solvent, for example, a method of drying the solution under reduced pressure (drying under reduced pressure) may be used; however, the method is not limited to this. It is preferable that the temperature for drying under reduced pressure is set to a temperature adjusted for the solvent to be distilled off. The solvent used for the separation treatment is a solvent having a high boiling point such as 210° C. or lower. Therefore, the temperature for drying under reduced pressure is preferably 40° C. to 250° C., and more preferably 50° C. to 230° C.

The time for drying under reduced pressure is not particularly limited; however, this time is preferably about 0.5 to 48 hours, and more preferably about 1 to 24 hours.

The temperature and time for the drying under reduced pressure effective for controlling the amount of volatile components vary with the size of the system to be dried. The optimal temperature and time may be selected in accordance with the vacuum drying machine to be used.

The pressure for the drying under reduced pressure is preferably 0.1 to 60 kPa, and more preferably 0.5 to 50 kPa.

Furthermore, as another method for producing the lignin derivative of the invention, the biomass cooking process used for pulp production as described above may be mentioned.

<Lignin Derivative Production Method 2: Cooking Process>

Regarding the cooking process, several types are known, and examples include a kraft cooking process, an alkali cooking process, a sulfite cooking process, and an organosolv process. Thus, various cooking processes can be used. Among these cooking processes, it is preferable to use an organosolv process of using a chemical agent including an organic solvent.

The reason for this is that there has been a tendency in recent years to utilize the major three components included in ligneous materials as chemical products in the organosolv process. If total utilization of the three components is made possible, reduction of the production cost for lignin derivatives and stable acquisition thereof are enabled. Also, it is highly meaningful to utilize lignin in applications of high added values, such as applications for rubber reinforcement or molding material, from the viewpoint of making biomass highly valuable.

According to the organosolv process, a lignin derivative that has been modified with a structure derived from a compound included in an organic solvent may also be obtained. Such a lignin derivative has excellent compatibility with a resin material or a rubber material. Therefore, a lignin derivative obtained by an organosolv process can be uniformly mixed into a resin material or a rubber material. Therefore, a rubber composition having excellent elastic modulus and tensile properties, or a molding material having excellent elastic modulus and mechanical strength is obtained.

Furthermore, such a lignin derivative almost does not contain sulfur components. Therefore, in a case in which the lignin derivative is used in a molding material, inconveniences such as sulfur-induced deterioration of long-term reliability of molded articles do not occur. Also, in a case in which the lignin derivative is used in a rubber composition, the risk of causing a vulcanization reaction is reduced. Thereby, a vulcanization reaction can be initiated by the addition of a vulcanizing agent that is implemented separately, and the degree of progress of the vulcanization reaction can be strictly controlled by the amount of addition of the vulcanizing agent. As a result, increase of the rubber viscosity at the time of kneading into a rubber composition, and overcure (over-vulcanization) or undercure (unvulcanization) can be controlled, and a rubber composition having excellent rubber characteristics can be prepared.

The sulfur percentage content in the lignin derivative according to the invention is preferably less than 0.05% by mass, and more preferably 0.03% by mass or less. Such a lignin derivative hardly causes a vulcanization reaction even if mixed with rubber as described above, and therefore, a vulcanization reaction can be more strictly controlled by addition of a vulcanizing agent.

Examples of such an organic solvent include lower alcohols such as methanol, ethanol, and propanol; ketones such as methyl ethyl ketone and acetone; cyclic ethers such as tetrahydrofuran and dioxane; phenols such as phenol and cresol; and carboxylic acids such as acetic acid. Among these, a solution containing a lower alcohol is particularly preferably used, and an aqueous solution of a lower alcohol is more preferably used. When such a solution is used, a solvent is introduced into the lignin derivative, and thereby solubility or compatibility with a resin material is enhanced. Furthermore, a lignin derivative having a molecular weight that has not been decreased more than necessary, can be obtained. Therefore, a lignin derivative which can be used to prepare a lignin resin composition, a rubber composition, or a molding material, all having excellent elastic modulus and tensile properties, is obtained.

The content of the organic solvent in such a chemical agent is not particularly limited; however, the content is preferably about 10% to 90% by mass, and more preferably about 30% to 70% by mass.

This chemical agent may also contain various additives that have been added, as necessary. Examples of the additives include alkali components such as sodium hydroxide, calcium hydroxide, and potassium hydroxide; sulfuric acid, hydrochloric acid, aluminum chloride, and alkaline earth metal salts.

The treatment temperature for the organosolv process is preferably 60° C. to 230° C., and the treatment time is preferably 10 to 360 minutes.

From black liquor or the like obtained after a cooking treatment, a lignin derivative can be collected by immersion, liquid-solid separation and drying, similarly to general organosolv processes.

Among organosolv processes, an Alcell (registered trademark) method of using an aqueous solution of a lower alcohol is preferably used.

A lignin derivative produced by an organosolv process such as described above may also be subjected to various additional treatments such as a modification treatment and a solvent extraction treatment, if necessary.

Regarding the modification treatment, for example, a treatment of introducing a functional group into a lignin derivative that has been produced by a biomass cooking process may be mentioned. For example, a treatment of bringing a compound containing a functional group to be introduced, into contact with the lignin derivative may be mentioned.

Furthermore, solvent extraction is a treatment of dissolving the lignin derivative produced by the above-described step in a solvent capable of dissolving lignin derivatives, and then taking out mainly a solvent-soluble fraction (treatment for purifying a lignin derivative).

Regarding the treatment for taking out a solvent-soluble fraction, for example, a treatment of filtering a solid residue obtained after dissolution in a solvent, and concentrating and drying a soluble fraction, may be mentioned. Since a lignin derivative that has been subjected to such a solvent extraction treatment has a low molecular weight and exhibits excellent thermofusibility, the lignin derivative is easily mixed with a phenolic resin or rubber, and the rubber reinforcing characteristics can be enhanced. Furthermore, since the molecular weight or physical properties are uniform, it is useful from the viewpoint that a homogeneous rubber composition or molding material can be prepared.

In a case in which a lignin derivative is extracted from biomass by an organosolv process using a chemical agent including a lower alcohol, it is more preferable to perform a solvent extraction treatment using acetone. Specific reasons for this are not clearly known; however, due to the difference in the intermolecular interaction between lignin derivatives and various solvents (lower alcohols and acetone), a lignin derivative having a smaller molecular weight than a lignin derivative from a stage of being extracted by an organosolv process, and having a uniform molecular weight and uniform physical properties can be purified.

<Lignin Resin Composition>

Next, the lignin resin composition of the invention will be explained.

The lignin resin composition of the invention includes a lignin derivative and a resin material. When such a lignin resin composition is mixed with a rubber material, a rubber composition having excellent rubber elastic modulus and tensile properties can be prepared. Particularly, when the lignin resin composition is mixed with a phenolic resin, a rubber composition in which a superior balance is achieved between low hysteresis loss characteristics, rubber elasticity and tensile properties, can be prepared.

(Resin Material)

The resin material to be mixed with the lignin derivative is not particularly limited, and examples include a phenolic resin, an epoxy-based resin, a furan-based resin, a urea-based resin, and a melamine-based resin. Among them, a phenolic resin is preferably used.

The amount of addition of the resin material for the lignin resin composition is preferably such that the amount of resin material is about 10 to 1,000 parts by mass, and more preferably about 20 to 500 parts by mass, with respect to 100 parts by mass of the lignin derivative. When a resin material is added at such a proportion, a phenolic resin and a lignin derivative can be crosslinked neither excessively nor insufficiently.

Examples of the phenolic resin include compounds obtained by causing a phenol, or a phenol and a modified compound, with an aldehyde. Above all, examples of the phenol include cresols such as o-cresol, m-cresol, and p-cresol; ethylphenols such as o-ethylphenol, m-ethylphenol, and p-ethylphenol; butylphenols such as isopropylphenol, butylphenol, and p-tert-butylphenol; and long-chain alkyl phenols such as p-tert-amylphenol, p-octylphenol, p-nonylphenol, and p-cumylphenol. Among these, one kind of phenolic resin or a mixture of two or more kinds thereof can be used.

On the other hand, examples of the modified compound include compounds having an aromatic structure, such as catechol, pyrogallol, bisphenol F, and bisphenol A, all of which have two or more hydroxyl groups in the molecule; compounds having a polycyclic aromatic structure, such as naphthol having a hydroxyl group; furan resins such as melamine, terpenes, and furfural; and plant-derived components such as tung oil, linseed oil, cashew oil, and tall oil. Meanwhile, since cashew oil or the like has a phenolic structure, a cashew resin is also included in the phenolic resin.

Among these, it is preferable that the phenolic resin includes at least one of a cashew-modified phenolic resin, a tall-modified phenolic resin, an alkyl-modified phenolic resin, and a cashew resin. Since these phenolic resins have excellent compatibility with rubber materials, it is considered that when such a phenolic resin is mixed with a rubber material, the phenolic resin is uniformly dispersed, and a homogeneous rubber composition can be prepared. That is, a homogeneous rubber composition having a high rubber elastic modulus can be obtained.

A cashew-modified phenolic resin is obtained by, for example, using cashew oil, which is a natural product containing cardanol having an unsaturated double bond in a side chain, and cardol, and subjecting this cashew oil to a condensation or addition reaction with a phenol and an aldehyde. Cashew-modified phenolic resins include novolac type and resol type resins, and all of them are used. However, when the cost and the like are considered, a novolac type cashew-modified phenolic resin is preferably used.

A tall-modified phenolic resin is a phenolic resin modified by tall oil. It is speculated that the tall-modified phenolic resin is in the form in which a double bond of an unsaturated fatty acid contained in tall oil is bonded to a phenol ring of a phenolic resin, in the form in which tall oil is dispersed and mixed in a phenolic resin, or in the form in which tall oil and a phenolic resin are mixed.

Examples of the alkyl-modified phenolic resin include compounds obtainable by reacting bisphenol A, or a phenol having an alkyl group, such as nonylphenol, octylphenol or dodecylphenol, with an aldehyde.

Examples of the cashew resin include cashew oil, which is a natural product containing cardanol having an unsaturated double bond in a side chain, and cardol; a polymerization product of cashew oil; and a polymerization product obtained by reacting cashew oil with an aldehyde or a saccharide.

When a phenol and a modified compound are caused to react, for example, inorganic acids such as hydrochloric acid, sulfuric acid, phosphoric acid, and phosphorous acid; organic acids such as oxalic acid, diethylsulfuric acid, para-toluenesulfonic acid, and an organic phosphonic acid; and metal salts such as zinc acetate can be used singly or in combination of two or more kinds thereof, as a catalyst.

The molecular weight of such a phenolic resin is not particularly limited; however, the number average molecular weight is preferably about 400 to 5,000, and more preferably about 500 to 3,000. When the number average molecular weight of the phenolic resin is set to be in the range described above, handleability of the phenolic resin is improved. If the number average molecular weight of the phenolic resin is less than the lower limit, there is a risk that the phenolic resin may become a viscous material having high viscosity depending on the composition of the phenolic resin, or even if solidified, the phenolic resin may be easily hardened depending on the environment. On the other hand, if the average molecular weight of the phenolic resin is more than the upper limit, there is a risk that it may be difficult for the phenolic resin to dissolve in a solvent, or compatibility with a blend may be decreased, depending on the composition of the phenolic resin.

The number average molecular weight of the phenolic resin can be measured using a method similar to that used for the lignin derivative.

The form of a lignin resin composition obtainable using such a resin material and a lignin derivative is not particularly limited; however, examples include a powder form, a particulate form, a pellet form, and a varnish form. From the viewpoint of handleability at the time of being mixed with a rubber material, it is preferable that the form of the lignin resin composition is a particulate form or a pellet form.

In addition to these, the rubber composition of the invention may also include a filler, a crosslinking agent, and other components, which will be described below.

The solid content concentration of the lignin resin composition is not particularly limited; however, for example, the solid content concentration may be about 60% to 98% by mass, and is preferably about 70% to 95% by mass.

<Method for Producing Lignin Resin Composition>

Next, a method for producing the above-described lignin resin composition will be explained.

The method for producing a lignin resin composition is not particularly limited; however, for example, a method of introducing the aforementioned raw materials into a kneading machine, and kneading the raw materials may be used. If necessary, it is also acceptable that arbitrary raw materials are preliminarily mixed and then kneaded. The order of kneading the aforementioned raw materials is not particularly limited, and all the raw materials may be kneaded simultaneously, or may be sequentially kneaded in an arbitrary order.

Examples of the kneading machine include a mixer, a kneader, and a roll.

In the case of performing kneading, if necessary, the raw materials may be heated, or an organic solvent may be used.

Examples of the organic solvent include methanol, ethanol, propanol, butanol, methylcellosolve, acetone, methyl ethyl ketone, methyl isobutyl ketone, N,N-dimethylformamide, N,N-dimethylacetamide, N-methyl-2-pyrrolidone, quinoline, cyclopentanone, m-cresol, and chloroform, and among these, one kind of the organic solvent or a mixture of two or more kinds thereof is used.

<Rubber Composition>

Next, the rubber composition of the invention will be explained.

The rubber composition of the invention includes at least a rubber material (raw material rubber) and the lignin derivative described above. Alternatively, the rubber composition of the invention includes at least a rubber material and the lignin resin composition described above. Such a rubber composition is well-balanced between the rubber elastic modulus and the low hysteresis loss characteristics. Such a rubber composition becomes useful as, for example, a tire rubber composition which can achieve a balance between satisfactory steering stability and reduction of rolling resistance.

(Rubber Material)

Examples of the rubber material include various natural rubbers and various synthetic rubbers. Specific examples include natural rubber (NR), modified natural rubber, styrene-butadiene rubber (SBR), butadiene rubber (BR), isoprene rubber (IR), butyl rubber (IIR), ethylene-propylene-diene rubber (EPDM), acrylonitrile-butadiene rubber (NBR), and chloroprene rubber (CR), and among these, one kind of rubber or a mixture of two or more kinds thereof can be used. Particularly, from the viewpoint of having excellent characteristics such as scratch resistance, abrasion resistance, fatigue resistance characteristics, and bending crack growth resistance, one or more kinds of rubber selected from natural rubber (NR), modified natural rubber, styrene-butadiene rubber (SBR), and butadiene rubber (BR) are preferably used. Furthermore, from the viewpoint of easy availability, at least one of natural rubber and butadiene rubber (BR) is more preferably used.

In a case in which styrene-butadiene rubber (SBR) and butadiene rubber (BR) are mixed, the percentage contents of SBR and BR are respectively preferably 50% by mass or less, and more preferably 30% by mass or less, in the rubber composition. In a case in which the percentage contents of SBR and BR are less than the upper limit, the proportion of petroleum resources in the rubber composition is suppressed to a low level, and thus environmental burden can be further reduced.

The rubber composition of the invention may also include at least one of a functional group-containing natural rubber (modified natural rubber) and a functional group-containing diene-based rubber, both of which contain at least one functional group selected from the group consisting of an alkoxyl group, an alkoxysilyl group, an epoxy group, a glycidyl group, a carbonyl group, an ester group, a hydroxyl group, an amino group and a silanol group. In a case in which natural rubber and a diene-based rubber contain these functional groups, these rubber materials react or interact with the surface of a filler, and thereby satisfactory dispersibility of the filler in the rubber composition is obtained.

It is preferable that the above-mentioned functional group is included in the rubber material at a proportion of about 0.001 to 80 mol %, more preferably at a proportion of about 0.01 to 50 mol %, and even more preferably at a proportion of about 0.02 to 25 mol %. If the content of the functional group is in the range described above, an effect that the rubber material reacts or interacts with the surface of a filler is obtained more satisfactorily, and viscosity increase at the time of production of unvulcanized rubber (rubber composition that does not contain a vulcanizing agent) is suppressed, so that satisfactory processability is obtained.

Examples of the method of incorporating the aforementioned functional groups into a rubber material include a method of introducing a functional group into a polymerized terminal of a styrene-butadiene copolymer that has been polymerized using an organolithium initiator in a hydrocarbon solvent; and a method of epoxidating natural rubber or a diene-based rubber by means of a chlorohydrin method, a direct oxidation method, a hydrogen peroxide method, an alkyl hydroperoxide method, or a peracid method.

In regard to the rubber composition of the invention, it is preferable that the blend of rubber components is set such that at least one of natural rubber, a modified natural rubber, styrene-butadiene rubber (SBR) and butadiene rubber (BR) occupies 50% to 100% by mass of the rubber material. When the blend of rubber components is set to be in the range described above, the rubber elastic modulus (storage modulus E') can be increased, and the hysteresis loss characteristics (loss tangent, tan δ, at near 60° C.) can be reduced. Thereby, for example, a tire rubber composition that can achieve a balance between satisfactory steering stability and reduction of rolling resistance can be obtained.

From the viewpoint of reducing environmental burden, it is desirable to increase the proportion of natural rubber or a modified natural rubber; however, since abrasion resistance or bending crack growth resistance of the rubber composition can be further enhanced by adding other rubber components such as styrene-butadiene rubber (SBR) and butadiene rubber (BR) to those natural rubber and modified natural rubber, the rubber components may be selected based on such viewpoints.

The amount of addition of the rubber material is not particularly limited; however, the amount of addition is preferably about 100 to 10,000 parts by mass, more preferably about 200 to 5,000 parts by mass, and even more preferably about 300 to 2,000 parts by mass, with respect to 100 parts by mass of the sum total of the lignin derivative and the resin. When the amount of addition of the rubber material is set to be in the range described above, the reinforcing effect of the rubber composition can be sufficiently secured, while the rubber composition can be prevented from acquiring excessively high hardness and decreased elongation.

(Filler)

Furthermore, the rubber composition of the invention may include a filler, in addition to the components described above.

Regarding the filler, those conventionally used in resin compositions or rubber compositions can be employed. Specifically, the filler may be at least one selected from the group consisting of carbon black, silica, alumina, and cellulose fibers, and particularly, at least one selected from silica and carbon black is preferably used. As these fillers are used, the rubber elastic modulus (storage modulus E') can be increased, and also, the hysteresis loss characteristics (loss tangent, tan δ, at near 60° C.) can be decreased.

The content of the filler is preferably about 10 to 150 parts by mass with respect to 100 parts by mass of the rubber material. When the content of the filler is set to be equal to or more than the lower limit, the rubber elastic modulus of the rubber composition can be increased. On the other hand, when the content of the filler is set to be equal to or less than the upper limit, excessive increase of the rubber elastic modulus is suppressed, processability at the time of preparation of the rubber composition is increased, and decrease in the abrasion resistance and elongation at break caused by deterioration of dispersibility of the filler in the rubber composition can be suppressed. Also, increase in the hysteresis loss characteristics of the rubber composition can be suppressed.

Particularly in a case in which silica is incorporated as a filler, it is preferable that silica is incorporated at a proportion of about 3 to 150 parts by mass with respect to 100 parts by mass of the rubber material, and also, a silane coupling agent is incorporated at a proportion of about 1 to 20% by mass of the silica content. When the content of silica is set to be equal to or more than the lower limit, the rubber elastic modulus of the rubber composition can be increased. On the other hand, when the content of silica is set to be equal to or less than the upper limit, processability at the time of preparation of the rubber composition can be increased while excessive increase of the rubber elastic modulus is suppressed. Furthermore, decrease in abrasion resistance and elongation at break caused by deterioration of dispersibility of the filler in the rubber composition can be suppressed. Furthermore, increase in the hysteresis loss characteristics of the rubber composition can be suppressed.

The content of silica is more preferably a proportion of about 5 to 100 parts by mass, and even more preferably a proportion of about 10 to 80 parts by mass, with respect to 100 parts by mass of the rubber material.

Regarding the silica, a silica that is conventionally used for rubber reinforcement can be used, and examples thereof include silica obtained by a dry method, silica obtained by a wet method, and colloidal silica. Particularly, the nitrogen adsorption specific surface area (N2SA) of silica is preferably 20 to 600 $m^2/g$, more preferably 40 to 500 $m^2/g$, and even more preferably 50 to 450 $m^2/g$. In a case in which the N2SA of silica is equal to or more than the lower limit, the reinforcing effect for the rubber composition is increased. On the other hand, in a case in which the N2SA of silica is equal to or less than the upper limit, dispersibility of silica in the rubber composition is improved, and for example, a rubber composition having excellent low hysteresis loss characteristics can be obtained.

The filler is not limited to the constituent material described above. Examples of the constituent material for the filler include silicates such as talc, calcined clay, uncalcined clay, mica, and glass; oxides such as titanium oxide and alumina; magnesium silicate; carbonates such as calcium carbonate, magnesium carbonate, and hydrotalcite; oxides such as zinc oxide and magnesium oxide; hydroxides such as aluminum hydroxide, magnesium hydroxide, and calcium hydroxide; sulfates or sulfites such as barium sulfate, calcium sulfate, and calcium sulfite; borates such as zinc borate, barium metaborate, aluminum borate, calcium borate, and sodium borate; and nitrides such as aluminum nitride, boron nitride, and silicon nitride. In the filler, powders, particles, fiber pieces, and the like formed from these materials are used.

In addition to this, inorganic fillers such as carbon fibers; organic fillers such as wood powder, pulverized powder of pulp, pulverized powder of fabric, a powdered cured product of thermosetting resin, aramid fibers, and talc; and the like can also be utilized as fillers that are included in the lignin resin composition.

(Crosslinking Agent)

The rubber composition of the invention may also include a crosslinking agent, in addition to the components described above.

The crosslinking agent is not particularly limited as long as the crosslinking agent can be crosslinked with any one or both of the rubber material and the lignin derivative; however, a crosslinking agent containing a compound represented by the following Formula (4) is preferably used.

$$Z-(CH_2OR)_m \quad (4)$$

[Z in Formula (4) represents any one of a melamine residue, a urea residue, a glycolyl residue, an imidazolidinone residue, and an aromatic ring residue; m represents an integer from 2 to 14; and R's each independently represent an alkyl group having 1 to 4 carbon atoms or a hydrogen atom, provided that —$CH_2OR$ is directly bonded to any one of a nitrogen atom of a melamine residue, a nitrogen atom of a primary amino group of a urea residue, a nitrogen atom of a secondary amino group of a glycolyl residue, a nitrogen atom of a secondary amino group of a imidazolidinone residue, and a carbon atom of an aromatic ring of an aromatic ring residue.]

A rubber composition containing such a compound has excellent mechanical characteristics after being cured, and also contributes to enhancement of durability and the external appearance of the cured product. This is because since the compound represented by Formula (4) that is included in the crosslinking agent can form polyfunctional crosslinking points, the lignin derivative is uniformly crosslinked at a high density, and a homogenous and rigid skeleton is formed. The mechanical characteristics and durability (boiling resistance and the like) of the cured product are enhanced due to the rigid skeleton, and also, since the occurrence of blistering or cracking is suppressed, the external appearance of the cured product is also enhanced.

Furthermore, —$CH_2OR$ is directly bonded, as described above, to any one of a nitrogen atom of a melamine residue, a nitrogen atom of a primary amino group of a urea residue, a nitrogen atom of a secondary amino group of a glycolyl residue, a nitrogen atom of a secondary amino group of an imidazolidinone residue, and a carbon atom of an aromatic ring of an aromatic ring residue; however, in a case in which two or more of "—$CH_2OR$" are bonded to the same nitrogen atom or carbon atom, it is preferable that "R" included in at least one of "—$CH_2OR$" among them is an alkyl group. Thereby, the lignin derivative (A) can be reliably crosslinked.

The melamine residue according to the present specification refers to a group having a melamine skeleton represented by the following Formula (A).

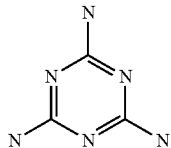

(A)

The urea residue according to the present specification refers to a group having a urea skeleton represented by the following Formula (B).

(B)

The glycolyl residue according to the present specification refers to a group having a glycolyl skeleton represented by the following Formula (C).

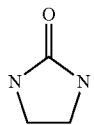

(C)

The imidazolidinone residue according to the present specification refers to a group having an imidazolidinone skeleton represented by the following Formula (D).

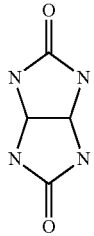

(D)

The aromatic ring residue according to the present specification refers to a group having an aromatic ring (benzene ring).

Regarding the compound represented by Formula (4), a compound represented by any one of the following Formulae (5) to (8) is particularly preferably used. These compounds react at the crosslinking reaction points on the aromatic ring included in the phenol skeleton of the lignin derivative, thus reliably crosslinking the lignin derivative, and also undergoes self-crosslinking caused by self-condensation reactions between the functional groups. As a result, a cured product having a particularly homogeneous and rigid skeleton and having excellent mechanical characteristics, durability and external appearance is obtained.

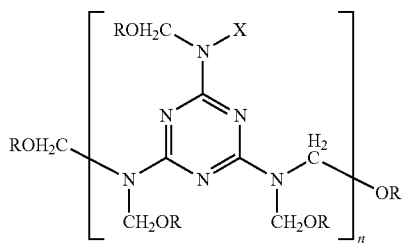

(5)

[In Formula (5), X represents $CH_2OR$ or a hydrogen atom; R's each independently represent an alkyl group having 1 to 4 carbon atoms, or a hydrogen atom; and n represents an integer from 1 to 3.]

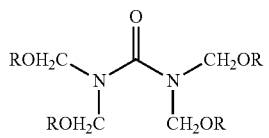

(6)

[In Formula (6), R's each independently represent an alkyl group having 1 to 4 carbon atoms, or a hydrogen atom.]

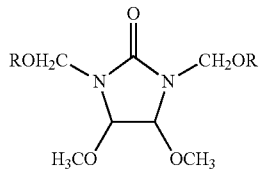

(7)

[In Formula (7), R's each independently represent an alkyl group having 1 to 4 carbon atoms, or a hydrogen atom.]

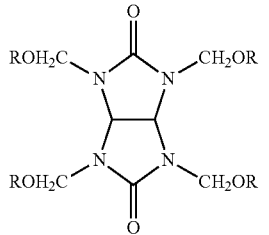

(8)

[In Formula (8), R's each independently represent an alkyl group having 1 to 4 carbon atoms, or a hydrogen atom.]

Regarding the compound represented by Formula (5), a compound represented by the following Formula (9) or the following Formula (10) is particularly preferably used. These react at the crosslinking reaction points on the aromatic ring included in the phenol skeleton of the lignin derivative to crosslink the lignin derivative particularly reliably, and also undergo self-crosslinking caused by self-condensation reactions between functional groups. As a result, a cured product having a particularly homogeneous and rigid skeleton and having excellent mechanical characteristics, durability and external appearance is obtained.

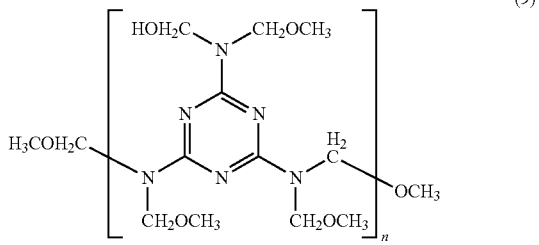

[In Formula (9), n represents an integer from 1 to 3.]

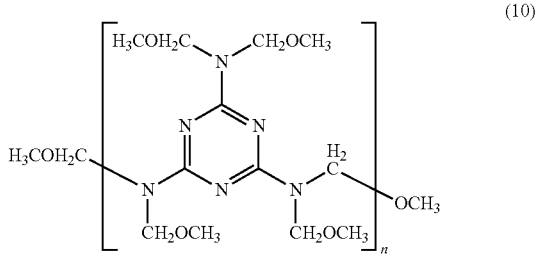

[In Formula (10), n represents an integer from 1 to 3.]

The crosslinking agent may contain, instead of the compound represented by Formula (4), or together with this compound, at least one compound selected from hexamethylenetetramine, quinuclidine, and pydine. A cured product containing such a crosslinking agent has excellent mechanical strength (durability and the like) and also has excellent external appearance. This is because hexamethylenetetramine, quinuclidine, and pydine bring about uniform crosslinking of the lignin derivative at a high density, and form a homogeneous and rigid skeleton.

The crosslinking agent may also contain a crosslinking agent component other than the compounds described above. Examples of the crosslinking agent component other than those compounds include epoxy resins such as an ortho-cresol-novolac epoxy resin, a bisphenol A type epoxy resin, epoxidated glycerin, epoxidated linseed oil, and epoxidated soybean oil; isocyanate compounds such as hexamethylene diisocyanate and toluene diisocyanate; as compounds that can crosslink lignin derivatives by causing an electrophilic substitution reaction with an aromatic ring of a lignin derivative, aldehydes such as formaldehyde, acetaldehyde, para-formaldehyde, and furfural; aldehyde sources such as polyoxymethylene; crosslinking agents conventionally known as phenolic resins, such as a resol type phenolic resin; and compounds that can crosslink lignin derivatives by causing an electrophilic substitution reaction with an aromatic ring of a lignin derivative. The percentage content of these crosslinking agent components in the crosslinking agent is preferably 80% by mass or more before the crosslinking reaction.

The amount of addition of the crosslinking agent is not particularly limited; however, the amount of addition is preferably about 5 to 120 parts by mass, and more preferably about 10 to 100 parts by mass, with respect to 100 parts by mass of the lignin derivative.

(Other Components)

The rubber composition of the invention may also include other components in addition to the components described above.

Examples of the other components include a softening agent, a tackifier, an antioxidant, an ozone degradation inhibitor, an aging inhibitor, a vulcanizing agent other than sulfur, a vulcanization accelerator, a vulcanization acceleration aid, a peroxide, zinc oxide, and stearic acid.

Regarding the vulcanizing agent, for example, an organic peroxide or a sulfur-based vulcanizing agent can be used.

Among these examples of the organic peroxide include benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, and 2,5-dimethyl-2,5-di(t-butylperoxy)hexyne-3,1,3-bis(t-butylperoxypropyl)benzene.

On the other hand, examples of the sulfur-based vulcanizing agent include sulfur and morpholine disulfide. Among these, sulfur is particularly preferably used.

Examples of the vulcanization accelerator include various sulfenamide-based, thiazole-based, thiuram-based, thiourea-based, guanidine-based, dithiocarbamic acid-based, aldehyde-amine-based, aldehyde-ammonia-based, imidazoline-based, and xanthate-based vulcanization accelerators, and a vulcanization accelerator including at least one of these is used.

The aging inhibitor is appropriately selected for use from, for example, various amine-based, phenol-based, and imidazole-based compounds, a carbamic acid metal salt, and a wax.

The rubber composition of the invention can further have compounding agents that are conventionally used in rubber industry, such as stearic acid and zinc oxide, mixed therein as appropriate.

The solid content concentration in the rubber composition is not particularly limited; however, for example, the solid content concentration is about 60% to 98% by mass, and preferably about 70% to 95% by mass.

Such a rubber composition is applicable to all conventional applications of rubber compositions, and is applicable specifically to applications such as tires, belts, rubber crawlers, vibration-proof rubber, and shoes.

<Method for Producing Rubber Composition>

Next, a method for producing the rubber composition described above will be explained.

The method for producing the rubber composition is not particularly limited; however, for example, the method includes a step of kneading a rubber material, a lignin derivative, and other raw materials. Meanwhile, if necessary, it is also acceptable that arbitrary raw materials are preliminarily mixed and then kneaded. The order of kneading the raw materials described above is not particularly limited, and all the raw materials may be simultaneously kneaded, or may be sequentially kneaded in any order.

Examples of the kneading machine include a mixer, a kneader, and a roll.

In the case of performing kneading, if necessary, an organic solvent may be used. Examples of the organic solvent include methanol, ethanol, propanol, butanol, methylcellosolve, acetone, methyl ethyl ketone, methyl isobutyl ketone, N,N-dimethylformamide, N,N-dimethylacetamide, N-methyl-2-pyrrolidone, quinoline, cyclopentanone, m-cresol, and chloroform, and among these, one kind of organic solvent or a mixture of two or more kinds thereof is used.

Here, an example of the method for producing a rubber composition will be described based on each step.

First, (1) a lignin derivative and a resin are mixed, and thus a mixed resin is obtained.

Next, (2) a rubber material, the mixed resin, and optional components (excluding a vulcanizing agent and a vulcanization accelerator) are kneaded using a sealed type kneading machine, and thus a rubber composition that does not contain a vulcanizing system (unvulcanized rubber composition) is obtained. At this time, the kneading conditions (kneading temperature, kneading time, and the like) are appropriately set in accordance with the kneading machine.

Next, (3) a vulcanizing agent and a vulcanization accelerator are added to the rubber composition obtained by the process of (2) using the above-mentioned kneading machine that includes rolls such as open rolls, the rubber composition is kneaded again, and thus a rubber composition containing a vulcanizing system is obtained.

<Method of Curing Rubber Composition>

Next, a step for obtaining a cured product of the rubber composition will be described.

A cured product of the rubber composition can be obtained by molding the rubber composition and curing the molded product. Since the molding method varies with the applications, the molding method is not particularly limited; however, in a case in which the rubber composition is molded using a mold, a method of molding the rubber composition thus produced, using a mold equipped with a hydraulic press is used. Thereby, a cured product of the rubber composition that has been molded into a desired shape is obtained.

It is also possible to use the rubber composition of the invention as, for instance, a tire rubber composition. For example, in a case in which the rubber composition of the invention is used as a rubber composition for cap tread of a tire, the rubber composition is produced by a conventional method. That is, an unvulcanized rubber composition is extrusion processed into the shape of tire tread, and then the extrusion processed rubber composition is adhered by a conventional method by means of a tire forming machine to form an unvulcanized tire. Next, the unvulcanized tire is heated and pressed in a vulcanizing machine, and thereby a tire can be obtained.

The molding temperature is preferably about 100° C. to 280° C., more preferably about 120° C. to 250° C., and even more preferably about 130° C. to 230° C. If the molding temperature is higher than the upper limit, there is a risk that rubber may be degraded, and if the molding temperature is lower than the lower limit, there is a risk that molding may not be sufficiently achieved.

<Molding Material>

Next, the molding material of the invention will be explained.

The molding material of the invention contains the lignin derivative described above. Alternatively, the molding material of the invention contains the lignin resin composition described above (mainly a lignin derivative and a resin material). These molding materials have excellent elastic modulus and mechanical strength.

Furthermore, since the molding material of the invention contains a plant-derived substance (lignin derivative), for example, even in a case in which the molding material is disposed of by incineration, the amount of increase of carbon dioxide in the atmosphere can be suppressed, compared to the case in which the molding material does not contain such a substance. Therefore, the molding material of the invention can promote reduction of environmental burdens.

The molding material of the invention can be produced by a method similar to the method for producing a rubber composition described above, and can be cured by a method similar to the effective method for a rubber composition described above.

Thus, the lignin derivative, the method for producing a lignin derivative, the lignin resin composition, the rubber composition, and the molding material of the invention have been explained; however, the invention is not intended to be limited to these. For example, the lignin resin composition, the rubber composition, and the molding material may also have various optional components added thereto.

EXAMPLES

Next, specific Examples of the invention will be described; however, the invention is not intended to be limited to these.

1. Production of Rubber Composition

Various raw materials used in Examples 1A to 10A and Comparative Examples 1A to 9A will be listed below.

Natural rubber: RSS3 manufactured by Touchi Co., Ltd.
Curing agent: Hexamethylenetetramine
Carbon black: manufactured by Mitsubishi Chemical Corporation, HAF
Silica: manufactured by Evonik Industries AG, Ultrasil VN3 (BET specific surface area: 175 m/g)
Silane coupling agent: manufactured by Evonik Industries AG, Si-69
Zinc oxide: manufactured by Sakai Chemical Industry Co., Ltd.
Stearic acid: Bead stearic acid YR manufactured by NOF Corporation
Sulfur: manufactured by Hosoi Chemical Industry Co., Ltd., fine sulfur powder
Vulcanization accelerator: manufactured by Ouchi Shinko Chemical Industrial Co., Ltd., MSA-G
Phenolic resin: manufactured by Sumitomo Bakelite Co., Ltd., PR-50731
Cashew-modified novolac-type phenolic resin: manufactured by Sumitomo Bakelite Co., Ltd., PR-12686
Tall-modified novolac-type phenolic resin: manufactured by Sumitomo Bakelite Co., Ltd., PR-13349

Example 1A (1) Lignin Derivative 300 g (absolute dry weight) of cedar chips and 1,600 g of pure water were introduced into a rotary autoclave having a capacity of 2.4 L. Then, while the content was stirred at a speed of rotation of 300 rpm, the content was treated at a treatment temperature of 300° C. and a treatment pressure of 9 MPa for 60 minutes, and thus the cedar chips were decomposed.

Next, the decomposition product was filtered and washed with pure water, and thereby a water-insoluble portion was separated. This water-insoluble portion was immersed in acetone and then filtered, and an acetone-soluble portion was collected.

Next, acetone was distilled off from the acetone-soluble portion, and lignin derivatives were obtained.

(2) Production of Rubber Composition

Next, 50 parts by mass of the lignin derivatives and 50 parts by mass of a cashew-modified phenolic resin were melted and mixed in advance on a hot plate at 130° C., and the mixture was pulverized. Thus, a mixed resin was obtained.

Next, 100 parts by mass of the mixed resin thus obtained, 500 parts by mass of a natural rubber compound, 350 parts by mass of carbon black, 10 parts by mass of hexamethylenetetramine as a resin crosslinking agent, 15 parts by mass of sulfur as a vulcanizing agent, 7.5 parts by mass of MSA-G as a vulcanization accelerator, 25 parts by mass of zinc oxide as a vulcanization acceleration aid, and 10 parts by mass of stearic acid as a mold releasing agent were kneaded at 100° C. in a BANBURY mixer. Thus, a rubber composition was obtained.

Example 2A

A rubber composition was obtained in the same manner as in Example 1A, except that the amount of the lignin derivatives was changed to 100 parts by mass, and a phenolic resin-based substance was not added thereto.

Example 3A

A rubber composition was obtained in the same manner as in Example 1A, except that 50 parts by mass of a tall-modified phenolic resin was added instead of the cashew-modified phenol.

Example 4A

A rubber composition was obtained in the same manner as in Example 1A, except that 50 parts by mass of a novolac type modified phenolic resin was added instead of the cashew-modified phenol.

Example 5A

A rubber composition was obtained in the same manner as in Example 1A, except that the amount of the lignin derivatives was changed to 75 parts by mass, and the amount of the cashew-modified phenolic resin was changed to 25 parts by mass.

Example 6A

A rubber composition was obtained in the same manner as in Example 1A, except that the amount of the lignin derivatives was changed to 25 parts by mass, and the amount of the cashew-modified phenolic resin was changed to 75 parts by mass.

Example 7A

A rubber composition was obtained in the same manner as in Example 1A, except that the biomass was eucalyptus-derived biomass.

Example 8A

A rubber composition was obtained in the same manner as in Example 2A, except that the biomass was eucalyptus-derived biomass.

Example 9A

A rubber composition was obtained in the same manner as in Example 1A, except that in regard to Example 1A, cedar chips were decomposed by treating the chips at a treatment pressure of 3 MPa for 180 minutes.

Example 10A

A rubber composition was obtained in the same manner as in Example 1A, except that lignin derivatives obtained by the Alcell (registered trademark) method, which is one of organosolv processes (Lignol Lignin (powder); manufactured by Lignol Innovations, Inc.), were dried at 150° C. and pulverized, and then the lignin derivatives were dissolved in acetone in an amount times the amount of the lignin derivatives. The solution was filtered to remove solid residue, and a supernatant was obtained. Subsequently, the supernatant was concentrated and dried, and thus lignin derivatives were obtained.

Comparative Example 1A (1) Biomass Decomposition Process 300 g (absolute dry weight) of cedar chips and 1,600 g of pure water were introduced into a rotary autoclave having a capacity of 2.4 L. Then, while the content was stirred at a speed of rotation of 300 rpm, the content was treated at a treatment temperature of 300° C. and a treatment pressure of 9 MPa for 60 minutes, and thereby the cedar chips were decomposed.

Next, the decomposition product was filtered and washed with pure water, and thereby a water-insoluble portion was separated. This water-insoluble portion was used as lignin derivatives.

(2) Production of Rubber Composition

Next, a rubber composition was obtained in the same manner as in Example 1A.

Comparative Example 2A

A rubber composition was obtained in the same manner as in Comparative Example 1A, except that the amount of the lignin derivatives was changed to 100 parts by mass, and a phenolic resin-based substance was not added thereto.

Comparative Example 3A

A rubber composition was obtained in the same manner as in Comparative Example 1A, except the biomass was eucalyptus-derived biomass.

Comparative Example 4A

A rubber composition was obtained in the same manner as in Comparative Example 2A, except that the biomass was eucalyptus-derived biomass.

Comparative Example 5A

A rubber composition was obtained in the same manner as in Comparative Example 1A, except that in regard to Comparative Example 1A, cedar chips were decomposed by treating the chips at a treatment pressure of 3 MPa for 180 minutes.

Comparative Example 6A

A rubber composition was obtained in the same manner as in Comparative Example 1A, except that lignin derivatives obtained by the Alcell (registered trademark) method (Lignol Lignin (powder); manufactured by Lignol Innovations, Inc.) were used after being dried at 150° C. and pulverized.

Comparative Example 7A

A rubber composition was obtained in the same manner as in Example 1A, except that the rubber composition was synthesized by using the rubber, filler, resin crosslinking agent, vulcanizing agent, vulcanization accelerator, vulcanization acceleration aid and mold releasing agent described in Example 1, without using lignin derivatives and a phenolic resin.

Comparative Example 8A

A rubber composition was obtained in the same manner as in Comparative Example 7A, except that 100 parts by mass of a novolac type phenol was added to Comparative Example 7A.

Comparative Example 9A

A rubber composition was obtained in the same manner as in Comparative Example 7A, except that 100 parts by mass of a cashew-modified phenol was added to Comparative Example 7A.

The lignin derivatives and the rubber compositions of Examples and Comparative Examples obtained as described above are presented in Tables 1 and 2.

2. Evaluation of Rubber Composition

First, each of the rubber compositions obtained in Examples 1A to 10A and Comparative Examples 1A to 9A was vulcanized at 160° C. for 20 minutes using a hydraulic press, and thereby a vulcanized rubber sheet having a thickness of 2 mm was produced.

2.1 Measurement of Tensile Stress at Breakage and Tensile Elongation at Breakage Next, for the rubber sheets, the tensile stress at breakage and the tensile elongation at breakage were measured according to the method specified in JIS K 6251 using a STROGRAPH manufactured by Toyo Seiki Kogyo Co., Ltd. The tensile rate at the time of measurement was set to 50 mm/min. Furthermore, the test specimen was a dumbbell type specimen, the distance between chucks was 60 mm, the width was 5 mm, and the measurement temperature was 25° C.

Next, the relative values of the measurement results for the rubber sheets obtained in various Examples and Comparative Examples were determined with respect to the measurement result for the rubber sheet obtained in Comparative Example 7A, which was taken as 100. The calculation results are presented in Tables 1 and 2.

2.2 Measurement of Storage Modulus E' and Loss Tangent Tan δ

Next, for the rubber sheets, the storage modulus E' at 30° C. and the reciprocal of the loss tangent, tan δ, at 60° C. were measured using a dynamic viscoelasticity analyzer manufactured by TA Instruments, Inc. under the conditions of a dynamic strain of 2%.

The length of the test specimen was set to 22 mm, the width to 10 mm, the rate of temperature increase to 5° C./min, the strain to 2%, and the measurement frequency to 1 Hz.

Next, the relative values of the measurement results for the rubber sheets obtained in various Examples and Comparative Examples were determined with respect to the measurement result for the rubber sheet obtained in Comparative Example 7A, which was taken as 100. The calculation results are presented in Tables 1 and 2.

When it is said that the value of reciprocal of the loss tangent, tan δ, is large, it means that the loss tangent, tan δ, of the viscoelasticity characteristics is small, that is, the hysteresis loss characteristics are low, and it further means that the heat energy generated due to repeated deformation is suppressed. Therefore, for example, in a case in which the rubber compositions obtained in the various Examples and Comparative Examples are applied to tire rubber compositions, tires having low rolling resistance can be obtained.

TABLE 1

|  |  |  |  | Example 1A | Example 2A | Example 3A | Example 4A | Example 5A | Example 6A |
|---|---|---|---|---|---|---|---|---|---|
| Raw material | Biomass |  |  | Cedar | Cedar | Cedar | Cedar | Cedar | Cedar |
| Cooking process | Solvent | Water | % by mass | 100 | 100 | 100 | 100 | 100 | 100 |
|  | Treatment temperature |  | ° C. | 300 | 300 | 300 | 300 | 300 | 300 |
|  | Treatment pressure |  | MPa | 9 | 9 | 9 | 9 | 9 | 9 |
|  | Treatment time |  | min | 60 | 60 | 60 | 60 | 60 | 60 |
| Purification process | Presence or absence |  | — | Present | Present | Present | Present | Present | Present |
| Lignin derivatives | Number average molecular weight of soluble component |  | — | 380 | 380 | 380 | 380 | 380 | 380 |
|  | Softening point of soluble component |  | ° C. | 107 | 107 | 107 | 107 | 107 | 107 |
|  | Acetone-solubility ratio |  | % by mass | >95 | >95 | >95 | >95 | >95 | >95 |
| Blend of rubber composition | Lignin derivatives |  | parts by mass | 50 | 100 | 50 | 50 | 75 | 25 |
|  | Resin | Cashew-modified phenolic resin | parts by mass | 50 | — | — | — | 25 | 75 |
|  |  | Tall-modified phenolic resin | parts by mass | — | — | 50 | — | — | — |
|  |  | Novolac type phenolic resin | parts by mass | — | — | — | 50 | — | — |
|  | Rubber | Natural rubber compound | parts by mass | 500 | 500 | 500 | 500 | 500 | 500 |
|  | Filler | Carbon black | parts by mass | 350 | 350 | 350 | 350 | 350 | 350 |

TABLE 1-continued

|  |  |  |  |  |  |  |  |  |
|---|---|---|---|---|---|---|---|---|
|  | Resin crosslinking agent | Hexamethylene-tetramine | parts by mass | 10 | 10 | 10 | 10 | 10 | 10 |
|  | Vulcanizing agent | Sulfur | parts by mass | 15 | 15 | 15 | 15 | 15 | 15 |
|  | Vulcanization accelerator | MSA-G | parts by mass | 7.5 | 7.5 | 7.5 | 7.5 | 7.5 | 7.5 |
|  | Vulcanization acceleration aid | Zinc oxide | parts by mass | 25 | 25 | 25 | 25 | 25 | 25 |
|  | Mold releasing agent | Stearic acid | parts by mass | 10 | 10 | 10 | 10 | 10 | 10 |
| Evaluation results for rubber composition (indicated as index) | Reciprocal of tan δ at 60° C. |  | — | 112 | 85 | 105 | 112 | 102 | 120 |
|  | Storage modulus at 30° C. |  | — | 684 | 312 | 587 | 631 | 433 | 783 |
|  | Tensile stress at breakage |  | — | 75 | 71 | 74 | 75 | 76 | 73 |
|  | Tensile elongation at breakage |  | — | 121 | 181 | 142 | 135 | 145 | 100 |

|  |  |  |  | Example 7A | Example 8A | Example 9A | Example 10A |
|---|---|---|---|---|---|---|---|
| Raw material | Biomass |  |  | *Eucalyptus* | *Eucalyptus* | Cedar | — |
| Cooking process | Solvent | Water | % by mass | 100 | 100 | 100 | — |
|  | Treatment temperature |  | ° C. | 300 | 300 | 230 | — |
|  | Treatment pressure |  | MPa | 9 | 9 | 3 | — |
|  | Treatment time |  | min | 60 | 60 | 180 | — |
| Purification process | Presence or absence |  | — | Present | Present | Present | Present |
| Lignin derivatives | Number average molecular weight of soluble component |  | — | 400 | 400 | 550 | 580 |
|  | Softening point of soluble component |  | ° C. | 111 | 111 | 133 | 115 |
|  | Acetone-solubility ratio |  | % by mass | >95 | >95 | >95 | >95 |
| Blend of rubber composition | Lignin derivatives |  | parts by mass | 50 | 100 | 50 | 100 |
|  | Resin | Cashew-modified phenolic resin | parts by mass | 50 | — | 50 | — |
|  |  | Tall-modified phenolic resin | parts by mass | — | — | — | — |
|  |  | Novolac type phenolic resin | parts by mass | — | — | — | — |
|  | Rubber | Natural rubber compound | parts by mass | 500 | 500 | 500 | 500 |
|  | Filler | Carbon black | parts by mass | 350 | 350 | 350 | 350 |
|  | Resin crosslinking agent | Hexamethylene-tetramine | parts by mass | 10 | 10 | 10 | 10 |
|  | Vulcanizing agent | Sulfur | parts by mass | 15 | 15 | 15 | 15 |
|  | Vulcanization accelerator | MSA-G | parts by mass | 7.5 | 7.5 | 7.5 | 7.5 |
|  | Vulcanization acceleration aid | Zinc oxide | parts by mass | 25 | 25 | 25 | 25 |
|  | Mold releasing agent | Stearic acid | parts by mass | 10 | 10 | 10 | 10 |
| Evaluation results for rubber composition (indicated as index) | Reciprocal of tan δ at 60° C. |  | — | 112 | 89 | 118 | 75 |
|  | Storage modulus at 30° C. |  | — | 735 | 345 | 792 | 284 |
|  | Tensile stress at breakage |  | — | 77 | 71 | 76 | 73 |
|  | Tensile elongation at breakage |  | — | 116 | 167 | 102 | 201 |

TABLE 2

|  |  |  |  | Comparative Example 1A | Comparative Example 2A | Comparative Example 3A | Comparative Example 4A | Comparative Example 5A |
|---|---|---|---|---|---|---|---|---|
| Raw material | Biomass |  |  | Cedar | Cedar | *Eucalyptus* | *Eucalyptus* | Cedar |
| Cooking process | Solvent | Water | % by mass | 100 | 100 | 100 | 100 | 100 |
|  | Treatment temperature |  | ° C. | 300 | 300 | 300 | 300 | 230 |
|  | Treatment pressure |  | MPa | 9 | 9 | 9 | 9 | 3 |
|  | Treatment time |  | min | 60 | 60 | 60 | 60 | 180 |
| Purification process | Presence or absence |  | — | Absent | Absent | Absent | Absent | Absent |

TABLE 2-continued

| | | | | | | | |
|---|---|---|---|---|---|---|---|
| Lignin derivatives | Number average molecular weight of soluble component | | — | — | — | — | — | — |
| | Softening point | ° C. | 200 | 200 | 200 | 200 | 200 |
| | Acetone-solubility ratio | % by mass | 16 | 16 | 18 | 18 | 12 |
| Blend of rubber composition | Lignin derivatives | parts by mass | 50 | 100 | 50 | 100 | 50 |
| | Resin | Cashew-modified phenolic resin | parts by mass | 50 | — | 50 | — | 50 |
| | | Tall-modified phenolic resin | parts by mass | — | — | — | — | — |
| | | Novolac type phenolic resin | parts by mass | — | — | — | — | — |
| | Rubber | Natural rubber compound | parts by mass | 500 | 500 | 500 | 500 | 500 |
| | Filler | Carbon black | parts by mass | 350 | 350 | 350 | 350 | 350 |
| | Resin crosslinking agent | Hexamethylene-tetramine | parts by mass | 10 | 10 | 10 | 10 | 10 |
| | Vulcanizing agent | Sulfur | parts by mass | 15 | 15 | 15 | 15 | 15 |
| | Vulcanization accelerator | MSA-G | parts by mass | 7.5 | 7.5 | 7.5 | 7.5 | 7.5 |
| | Vulcanization acceleration aid | Zinc oxide | parts by mass | 25 | 25 | 25 | 25 | 25 |
| | Mold releasing agent | Stearic acid | parts by mass | 10 | 10 | 10 | 10 | 10 |
| Evaluation results for rubber composition (indicated as index) | Reciprocal of tan δ at 60° C. | — | 72 | 60 | 75 | 64 | 63 |
| | Storage modulus at 30° C. | — | 645 | 312 | 664 | 374 | 669 |
| | Tensile stress at breakage | — | 65 | 61 | 63 | 60 | 67 |
| | Tensile elongation at breakage | — | 71 | 76 | 71 | 74 | 83 |

| | | | | Comparative Example 6A | Comparative Example 7A | Comparative Example 8A | Comparative Example 9A |
|---|---|---|---|---|---|---|---|
| Raw material | Biomass | | — | — | — | — | — |
| Cooking process | Solvent | Water | % by mass | — | — | — | — |
| | Treatment temperature | | ° C. | — | — | — | — |
| | Treatment pressure | | MPa | — | — | — | — |
| | Treatment time | | min | — | — | — | — |
| Purification process | Presence or absence | | — | Absent | — | — | — |
| Lignin derivatives | Number average molecular weight of soluble component | | — | — | — | — | — |
| | Softening point | | ° C. | 180 | — | — | — |
| | Acetone-solubility ratio | | % by mass | 71 | — | — | — |
| Blend of rubber composition | Lignin derivatives | | parts by mass | 50 | — | — | — |
| | Resin | Cashew-modified phenolic resin | parts by mass | 50 | — | — | 100 |
| | | Tall-modified phenolic resin | parts by mass | — | — | — | — |
| | | Novolac type phenolic resin | parts by mass | — | — | 100 | — |
| | Rubber | Natural rubber compound | parts by mass | 500 | 500 | 500 | 500 |
| | Filler | Carbon black | parts by mass | 350 | 350 | 350 | 350 |
| | Resin crosslinking agent | Hexamethylene-tetramine | parts by mass | 10 | — | 10 | 10 |
| | Vulcanizing agent | Sulfur | parts by mass | 15 | 15 | 15 | 15 |
| | Vulcanization accelerator | MSA-G | parts by mass | 7.5 | 7.5 | 7.5 | 7.5 |
| | Vulcanization acceleration aid | Zinc oxide | parts by mass | 25 | 25 | 25 | 25 |
| | Mold releasing agent | Stearic acid | parts by mass | 10 | 10 | 10 | 10 |
| Evaluation results for rubber composition (indicated as index) | Reciprocal of tan δ at 60° C. | | — | 82 | 100 | 111 | 120 |
| | Storage modulus at 30° C. | | — | 793 | 100 | 755 | 980 |
| | Tensile stress at breakage | | — | 64 | 100 | 58 | 67 |
| | Tensile elongation at breakage | | — | 88 | 100 | 70 | 72 |

As is obvious from Tables 1 and 2, it was acknowledged that in regard to the cured products of the rubber compositions obtained in Examples 1A to 10A, both the storage modulus E' and the tensile stress at breakage of the cured products of the rubber compositions can be increased by adding lignin derivatives.

Furthermore, it was acknowledged that when a resin is added together with lignin derivatives, the reciprocal of the loss tangent, tan δ, at 60° C. can be made large compared to the case in which a resin is not added, and the hysteresis loss characteristics of the cured products of the rubber compositions can be reduced.

Therefore, it was acknowledged that a satisfactory balance between the rubber elastic modulus and the hysteresis loss characteristics is achieved by adding lignin derivatives and a resin (by adding a lignin resin composition).

The number average molecular weights of soluble components in the lignin derivatives used in Examples 1A to 10A were in the range of 300 to 2,000. The softening points of the soluble components in the lignin derivatives used in Examples 1A to 10A were 100° C. to 180° C. The percentage contents of components that are soluble in acetone (acetone-solubility ratio) in the lignin derivatives used in Examples 1A to 10A were all 80% by mass or more.

3. Production of Rubber Composition

Various raw materials used in Examples 1B to 12B and Comparative Examples 1B to 3B will be listed below.

Natural rubber: RSS3 manufactured by Touchi Co., Ltd.
Curing agent: Hexamethylenetetramine
Carbon black: manufactured by Mitsubishi Chemical Corporation, HAF
Silica: manufactured by Evonik Industries AG, ULTRASIL VN3 (BET specific surface area: 175 m/g)
Silane coupling agent: manufactured by Evonik Industries AG, Si-69
Zinc oxide: manufactured by Sakai Chemical Industry Co., Ltd.
Stearic acid: Bead stearic acid YR manufactured by NOF Corporation
Sulfur: manufactured by Hosoi Chemical Industry Co., Ltd., fine sulfur powder
Vulcanization accelerator: manufactured by Ouchi Shinko Chemical Industrial Co., Ltd., MSA-G
Phenolic resin: manufactured by Sumitomo Bakelite Co., Ltd., PR-50731
Cashew-modified novolac-type phenolic resin: manufactured by Sumitomo Bakelite Co., Ltd., PR-12686
Tall-modified novolac-type phenolic resin: manufactured by Sumitomo Bakelite Co., Ltd., PR-13349

Example 1B (1) Lignin Derivatives

Lignin derivatives obtained by the Alcell (registered trademark) method (Lignol Lignin (powder); manufactured by Lignol Innovations, Inc.) were dissolved in acetone in an amount times the mass of the lignin derivatives. The solution was filtered to remove solid residue, and a supernatant was obtained. Subsequently, the supernatant was concentrated and dried, and thus lignin derivatives were obtained.

(2) Production of Rubber Composition

Next, 50 parts by mass of the lignin derivatives and 50 parts by mass of a tall-modified phenolic resin were melted and mixed in advance on a hot plate at 130° C., and the mixture was pulverized. Thus, a mixed resin was obtained.

Next, 100 parts by mass of the mixed resin thus obtained, 500 parts by mass of a natural rubber compound, 350 parts by mass of carbon black, 10 parts by mass of hexamethylenetetramine as a resin crosslinking agent, 15 parts by mass of sulfur as a vulcanizing agent, 7.5 parts by mass of MSA-G as a vulcanization accelerator, 25 parts by mass of zinc oxide as a vulcanization acceleration aid, and 10 parts by mass of stearic acid as a mold releasing agent were kneaded at 100° C. in a BANBURY mixer. Thus, a rubber composition was obtained.

Example 2B

A rubber composition was obtained in the same manner as in Example 1B, except that a novolac type phenolic resin was added instead of the tall-modified phenolic resin.

Example 3B

A rubber composition was obtained in the same manner as in Example 1B, except that a cashew-modified phenolic resin was added instead of the tall-modified phenolic resin.

Example 4B

A rubber composition was obtained in the same manner as in Example 3B, except that the amount of addition of the lignin derivatives and the amount of addition of the cashew-modified phenolic resin were respectively changed as indicated in Table 3.

Example 5B

A rubber composition was obtained in the same manner as I Example 3B, except that the amount of addition of the lignin derivatives and the amount of addition of the cashew-modified phenolic resin were respectively changed as indicated in Table 3.

Example 6B

A rubber composition was obtained in the same manner as in Example 1B, except that the addition of the tall-modified phenolic resin was omitted, and the amount of the lignin derivatives was changed to 100 parts by mass.

Example 7B

A rubber composition was obtained in the same manner as in Example 3B, except that silica was further added as a filler, and the amount of addition of carbon black was changed as indicated in Table 1.

Example 8B

A rubber composition was obtained in the same manner as in Example 6B, except that the lignin derivatives (Lignol Lignin (powder); manufactured by Lignol Innovations, Inc.) were directly used.

Example 9B

A rubber composition was obtained in the same manner as in Example 3B, except that the lignin derivatives (Lignol Lignin (powder); manufactured by Lignol Innovations, Inc.) were directly used.

Example 10B

A rubber composition was obtained in the same manner as in Example 6B, except that hexamethylenetetramine was not used.

Example 11B (1) Biomass Decomposition Process 300 g (absolute dry weight) of cedar chips and 1,600 g of pure water were introduced into a rotary autoclave having a capacity of 2.4 L. Then, while the content was stirred at a speed of rotation of 300 rpm, the content was treated at a treatment temperature of 300° C. and a treatment pressure of 9 MPa for 180 minutes, and thereby the cedar chips were decomposed.

Next, the decomposition product was filtered and washed with pure water, and thereby a water-insoluble portion was separated. This water-insoluble portion was immersed in acetone and then filtered, and thus an acetone-soluble portion was collected.

Next, acetone was distilled off from the acetone-soluble portion, and lignin derivatives were obtained.

(2) Production of Rubber Composition

Next, a rubber composition was obtained in the same manner as in Example 3B.

Example 12B

A rubber composition was obtained in the same manner as in Example 11B, except that the addition of the cashew-modified phenolic resin is omitted, and the amount of the lignin derivatives was changed to 100 parts by mass.

Comparative Example 1B

A rubber composition was obtained in the same manner as in Example 11B, except that the addition of the lignin derivatives, the addition of the cashew-modified phenolic resin, and the addition of the resin crosslinking agent were respectively omitted.

Comparative Example 2B

A rubber composition was obtained in the same manner as in Example 11B, except that the addition of the lignin derivatives and the addition of the cashew-modified phenolic resin were respectively omitted, and 100 parts by mass of a novolac type phenolic resin was added to the rubber composition.

Comparative Example 3B

A rubber composition was obtained in the same manner as in Example 11B, except that the addition of the lignin derivatives was omitted, and 100 parts by mass of a cashew-modified phenolic resin was added to the rubber composition.

4. Evaluation of Rubber Composition

First, each of the rubber compositions obtained in Examples 1B to 12B and Comparative Examples 1B to 3B was vulcanized at 160° C. for 20 minutes using a hydraulic press, and thereby a vulcanized rubber sheet having a thickness of 2 mm was produced.

4.1 Measurement of Tensile Stress at Breakage and Tensile Elongation at Breakage Next, for the rubber sheets, the tensile stress at breakage and the tensile elongation at breakage were measured according to the method specified in JIS K 6251 using a STROGRAPH manufactured by Toyo Seiki Kogyo Co., Ltd. The tensile rate at the time of measurement was set to 50 mm/min. Furthermore, the test specimen was a dumbbell type specimen, the distance between chucks was 60 mm, the width was 5 mm, and the measurement temperature was 25° C.

Next, the relative values of the measurement results for the rubber sheets obtained in various Examples and Comparative Examples were determined with respect to the measurement result for the rubber sheet obtained in Comparative Example 1B, which was taken as 100. The calculation results are presented in Table 3.

4.2 Measurement of Storage Modulus E' and Loss Tangent Tan δ

Next, for the rubber sheets, the storage modulus E' at 30° C. and the reciprocal of the loss tangent, tan δ, at 60° C. were measured using a dynamic viscoelasticity analyzer manufactured by TA Instruments, Inc. under dynamic conditions.

The length of the test specimen was set to 22 mm, the width to 10 mm, the rate of temperature increase to 5° C./min, the strain to 2%, and the measurement frequency to 1 Hz.

Next, the relative values of the measurement results for the rubber sheets obtained in various Examples and Comparative Examples were determined with respect to the measurement result for the rubber sheet obtained in Comparative Example 1B, which was taken as 100. The calculation results are presented in Table 3.

TABLE 3

| | | | | Example 1B | Example 2B | Example 3B | Example 4B | Example 5B | Example 6B | Example 7B | Example 8B |
|---|---|---|---|---|---|---|---|---|---|---|---|
| Blend of rubber composition | Lignin derivatives | | parts by mass | 50 | 50 | 50 | 75 | 25 | 100 | 50 | 100 |
| | Resin | Cashew-modified phenolic resin | parts by mass | — | — | 50 | 25 | 75 | — | 50 | — |
| | | Tall-modified phenolic resin | parts by mass | 50 | — | — | — | — | — | — | — |
| | | Novolac type phenolic resin | parts by mass | — | 50 | — | — | — | — | — | — |
| | Rubber | Natural rubber compound | parts by mass | 500 | 500 | 500 | 500 | 500 | 500 | 500 | 500 |
| | Filler | Carbon black | parts by mass | 350 | 350 | 350 | 350 | 350 | 350 | 280 | 350 |
| | | Silica | parts by mass | — | — | — | — | — | — | 70 | — |
| | Resin crosslinking agent | Hexamethylenetetramine | parts by mass | 10 | 10 | 10 | 10 | 10 | 10 | 10 | 10 |

TABLE 3-continued

|  |  |  |  |  |  |  |  |  |  |  |
|---|---|---|---|---|---|---|---|---|---|---|
|  | Vulcanizing agent | Sulfur | parts by mass | 15 | 15 | 15 | 15 | 15 | 15 | 15 | 15 |
|  | Vulcanization accelerator | MSA-G | parts by mass | 7.5 | 7.5 | 7.5 | 7.5 | 7.5 | 7.5 | 7.5 | 7.5 |
|  | Vulcanization acceleration aid | Zinc oxide | parts by mass | 25 | 25 | 25 | 25 | 25 | 25 | 25 | 25 |
|  | Mold releasing agent | Stearic acid | parts by mass | 10 | 10 | 10 | 10 | 10 | 10 | 10 | 10 |
| Evaluation results for rubber composition (indicated as index) | Reciprocal of tan δ at 60° C. |  | — | 110 | 117 | 122 | 110 | 124 | 85 | 126 | 78 |
|  | Storage modulus at 30° C. |  | — | 691 | 721 | 966 | 774 | 1023 | 353 | 931 | 291 |
|  | Tensile stress at breakage |  | — | 80 | 78 | 73 | 79 | 73 | 77 | 75 | 74 |
|  | Tensile elongation at breakage |  | — | 102 | 97 | 94 | 108 | 83 | 113 | 91 | 107 |

|  |  |  |  | Example 9B | Example 10B | Example 11B | Example 12B | Comparative Example 1B | Comparative Example 2B | Comparative Example 3B |
|---|---|---|---|---|---|---|---|---|---|---|
| Blend of rubber composition | Lignin derivatives |  | parts by mass | 50 | 100 | 50 | 100 | — | — | — |
|  | Resin | Cashew-modified phenolic resin | parts by mass | 50 | — | 50 | 0 | — | — | 100 |
|  |  | Tall-modified phenolic resin | parts by mass | — | — | — | — | — | — | — |
|  |  | Novolac type phenolic resin | parts by mass | — | — | — | — | — | 100 | — |
|  | Rubber | Natural rubber compound | parts by mass | 500 | 500 | 500 | 500 | 500 | 500 | 500 |
|  | Filler | Carbon black | parts by mass | 350 | 350 | 350 | 350 | 350 | 350 | 350 |
|  |  | Silica | parts by mass | — | — | — | — | — | — | — |
|  | Resin crosslinking agent | Hexamethylene-tetramine | parts by mass | 10 | — | 10 | 10 | — | 10 | 10 |
|  | Vulcanizing agent | Sulfur | parts by mass | 15 | 15 | 15 | 15 | 15 | 15 | 15 |
|  | Vulcanization accelerator | MSA-G | parts by mass | 7.5 | 7.5 | 7.5 | 7.5 | 7.5 | 7.5 | 7.5 |
|  | Vulcanization acceleration aid | Zinc oxide | parts by mass | 25 | 25 | 25 | 25 | 25 | 25 | 25 |
|  | Mold releasing agent | Stearic acid | parts by mass | 10 | 10 | 10 | 10 | 10 | 10 | 10 |
| Evaluation results for rubber composition (indicated as index) | Reciprocal of tan δ at 60° C. |  | — | 107 | 81 | 113 | 69 | 100 | 111 | 120 |
|  | Storage modulus at 30° C. |  | — | 793 | 342 | 686 | 331 | 100 | 755 | 980 |
|  | Tensile stress at breakage |  | — | 72 | 78 | 76 | 70 | 100 | 58 | 67 |
|  | Tensile elongation at breakage |  | — | 91 | 187 | 106 | 175 | 100 | 70 | 72 |

As is obvious from Table 3, it was acknowledged that in regard to the cured products of the rubber compositions obtained in Examples 1B to 12B, both the storage modulus E' and the tensile stress at breakage of the cured products of the rubber compositions can be increased by adding lignin derivatives.

Furthermore, it was acknowledged that when a resin is added together with lignin derivatives, the reciprocal of the loss tangent, tan δ, at 60° C. can be made large compared to the case in which a resin is not added, and the hysteresis loss characteristics of the cured products of the rubber compositions can be reduced.

Therefore, it was acknowledged that a satisfactory balance between the rubber elastic modulus and the hysteresis loss characteristics is achieved by adding lignin derivatives and a resin material (by adding a lignin resin composition).

The number average molecular weights of soluble components in the lignin derivatives used in Examples 1B to 12B were in the range of 300 to 2,000. The softening points of the soluble components in the lignin derivatives used in Examples 1B to 12B were 100° C. to 200° C. The percentage contents of components that are soluble in acetone (acetone-solubility ratio) in the lignin derivatives used in Examples 1B to 12B were all 80% by mass or more.

5. Production and Evaluation of Molding Material

Next, resin molded products were prepared using lignin derivatives and a phenolic resin (PR-53194, Sumitomo Bakelite Co., Ltd.). Then, an evaluation of the external appearance and flexural strength was performed by the following methods. The evaluation results are presented in Table 4.

Examples 13B to 18B and Comparative Examples 4B and 5B 5.1 Preparation of Lignin Resin Composition Lignin derivatives, a phenolic resin (PR-53194, manufactured by Sumitomo Bakelite Co., Ltd.), and hexamethylenetetramine were mixed at normal temperature at the proportions indicated in Table 4, and the mixture was pulverized and mixed. Thus, a lignin resin composition was prepared.

In Examples 13B to 16B, the same lignin derivatives as those used in Example 1B were used. In Example 17B, the same lignin derivatives as those used in Example 8B were used. In Example 18B, the same lignin derivatives as those used in Example 11B were used.

In Comparative Example 5B, lignin derivatives obtained using the following method were used.

300 g (absolute dry weight) of cedar chips and 1,600 g of pure water were introduced into a rotary autoclave having a capacity of 2.4 L. Then, while the content was stirred at a speed of rotation of 300 rpm, the content was treated at a treatment temperature of 300° C. and a treatment pressure of 9 MPa for 60 minutes, and thereby the cedar chips were decomposed. Next, the decomposition product was filtered and washed with pure water, and thereby a water-insoluble portion was separated. This water-insoluble portion was used as lignin derivatives.

The amounts of addition of various components were set so as to obtain the blends indicated in Table 4, and thus the various lignin resin compositions of Examples 13B to 18B and Comparative Examples 4B and 5B were prepared.

5.2 Preparation of Resin Molded Product

To the lignin resin compositions of Examples 13B to 18B and Comparative Example 4B, glass fibers (milled glass fibers, manufactured by Nitto Boseki Co., Ltd., reference fiber diameter: 10±1.5 μm, average fiber length: 90 μm) were added such that the mixed proportion of the glass fibers and the lignin resin composition was 50.5% by weight. The mixture was kneaded using a LABO PLASTOMILL at 90° C. and 50 rpm, and the kneaded product thus obtained was subjected to extrusion molding under the conditions of 175° C. and 3 min, and then was cured. Thereby, a resin molded product which measured 10 mm in width, 100 mm in length, and 4 mm in height was obtained. On the other hand, the lignin resin composition of Comparative Example 5B and glass fibers were kneaded using a method similar to that described above; however, the lignin resin composition and the glass fibers could not be uniformly mixed. Therefore, a resin molded product having a predetermined dimension could not be obtained by extrusion molding.

5.3 Measurement of Flexural Strength at Normal Temperature

Using the various resin molded products thus obtained, flexural strength at 25° C. was determined according to JIS K 6911. Specifically, a three-point bending test was performed by applying a load at a speed of 2 mm/min using a precision universal testing machine (AUTOGRAPH AG-X plus manufactured by Shimadzu Corporation).

As is obvious from Table 4, it was acknowledged that the cured products of the molding materials of Examples 13B to 18B exhibited larger bending stress at room temperature and large elastic moduli, compared to the cured product of the molding material of Comparative Example 4B.

Therefore, it was acknowledged that in regard to the cured products of the molding materials of Examples 13B to 18B, both the elastic modulus and the mechanical strength can be increased by adding lignin derivatives thereto. It was also acknowledged that mechanical strength in a heat-resistant environment can also be increased.

INDUSTRIAL APPLICABILITY

According to the invention, when a lignin derivative having a predetermined number average molecular weight and containing a component that is soluble in a polar organic solvent (soluble component) is incorporated, a lignin resin composition, a rubber composition, or a molding material, all of which have excellent low hysteresis loss characteristics, elastic modulus, or tensile properties, can be obtained. Furthermore, when a component that is thermofusible is used as the soluble component, a lignin resin composition, a rubber composition, or a molding material, all of which have superior aforementioned characteristics, can be obtained. Particularly, when a phenolic resin is incorporated, the lignin resin composition, rubber composition, or molding material thus obtainable exhibits excellent low hysteresis loss characteristics, and achieves an excellent balance between elastic modulus, moldability, and tensile properties. Therefore, the invention has industrial applicability.

The invention claimed is:

1. A lignin derivative extracted from biomass and used for rubber reinforcement or for use in a molding material, the lignin derivative containing a soluble component in a polar organic solvent in an amount of 95% by mass or more and an insoluble component in a polar organic solvent in an amount of 1 to 5% by mass, and the soluble component having a number average molecular weight of 300 to 2,000.

2. The lignin derivative according to claim 1, wherein the polar organic solvent is acetone.

3. The lignin derivative according to claim 1, wherein the number average molecular weight of the soluble component is 300 to 750.

4. The lignin derivative according to claim 1, wherein the softening temperature of the soluble component is 80° C. to 160° C.

TABLE 4

| | | | Example 13B | Example 14B | Example 15B | Example 16B | Example 17B | Example 18B | Comparative Example 4B | Comparative Example 5B |
|---|---|---|---|---|---|---|---|---|---|---|
| Blend of resin composition | Lignin derivatives | parts by mass | 20 | 40 | 50 | 65 | 50 | 50 | — | 50 |
| | Novolac type phenolic resin | parts by mass | 80 | 60 | 50 | 35 | 50 | 50 | 100 | 50 |
| | Hexamethylene-tetramine | parts by mass | 15 | 15 | 15 | 15 | 15 | 15 | 15 | 15 |
| Evaluation results for resin molded product | Elastic modulus at 25° C. | GPa | 19.3 | 18.6 | 19.1 | 17.1 | 18.2 | 18 | 14.9 | — |
| | Flexural strength at 25° C. | MPa | 201 | 194 | 193 | 153 | 175 | 165 | 132 | — |

5. The lignin derivative according to claim 1, wherein the lignin derivative is extracted by cooking biomass by means of an organosolv process using a chemical agent including an organic solvent.

6. The lignin derivative according to claim 5, wherein the organic solvent includes at least one of an alcohol, a ketone, and an ether.

7. The lignin derivative according to claim 5, wherein the organic solvent includes a lower alcohol.

8. The lignin derivative according to claim 7, wherein the lignin derivative is further purified by using an another organic solvent including acetone.

9. A lignin resin composition comprising:
the lignin derivative according to claim 1; and
a resin material.

10. The lignin resin composition according to claim 9, wherein the resin material includes a phenolic resin.

11. The lignin resin composition according to claim 10, wherein the phenolic resin includes at least one of a cashew-modified phenolic resin, an alkyl-modified phenolic resin, and a cashew resin.

12. A rubber composition comprising:
the lignin derivative according to claim 1; and
a rubber material.

13. The rubber composition according to claim 12, wherein the rubber material includes at least one of natural rubber, butadiene rubber, and styrene-butadiene rubber.

14. The rubber composition according to claim 12, further comprising a crosslinking agent and/or a filler.

15. A molding material comprising:
the lignin derivative according to claim 1; and
a resin material.

* * * * *